(12) United States Patent
Hong

(10) Patent No.: US 12,119,512 B2
(45) Date of Patent: Oct. 15, 2024

(54) METHOD FOR PREPARING COMPOSITE SEPARATOR INCLUDING CONTROLLING AMOUNT OF NON-SOLVENT SUPPLIED DURING HOT-AIR DRYING, COMPOSITE SEPARATOR INCLUDING POROUS SUBSTRATE WITH FLUORINE-BASED RESIN POROUS LAYER WITH MORE SMALL-DIAMETER PORES THAN LARGE-DIAMETER PORES, AND LITHIUM BATTERY COMPRISING COMPOSITE SEPARATOR

(71) Applicant: Samsung SDI Co., Ltd., Yongin-si (KR)

(72) Inventor: Daehyun Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 165 days.

(21) Appl. No.: 17/195,437

(22) Filed: Mar. 8, 2021

(65) Prior Publication Data
US 2021/0280943 A1    Sep. 9, 2021

(30) Foreign Application Priority Data
Mar. 9, 2020    (KR) .................... 10-2020-0029164

(51) Int. Cl.
*H01M 50/403*    (2021.01)
*H01M 10/052*    (2010.01)
(Continued)

(52) U.S. Cl.
CPC ....... *H01M 50/403* (2021.01); *H01M 10/052* (2013.01); *H01M 50/426* (2021.01);
(Continued)

(58) Field of Classification Search
CPC ............. H01M 50/403; H01M 50/426; H01M 50/446; H01M 50/449; H01M 50/434
(Continued)

(56) References Cited

U.S. PATENT DOCUMENTS 10,193,117 B2    1/2019    Nishikawa
10,381,625 B2    8/2019    Choi et al.
(Continued)

FOREIGN PATENT DOCUMENTS

JP    1996-111222 A      4/1996
JP    2012099324 A  *   5/2012
(Continued)

OTHER PUBLICATIONS

Thackeray, Kayla, The Definitive Guide to ASTM D790 Flexure Testing of Plastics, 2022, Instron®, 1-16 (Year: 2022).*
(Continued)

*Primary Examiner* — Sean P Cullen
(74) *Attorney, Agent, or Firm* — Lewis Roca Rothgerber Christie LLP

(57) ABSTRACT

A method of preparing a composite separator for a lithium battery includes: coating a binder composition on one side or both sides of a porous substrate; hot-air drying the porous substrate coated with the binder composition; and supplying a non-solvent during the hot-air drying, such that a porous layer is on one side or both sides of the porous substrate, wherein the binder composition includes a good-solvent, a binder, and inorganic particles, an amount of the non-solvent supplied during the hot-air drying is from 12 $g/m^3$ to 17 $g/m^3$, and a ratio (e) of the hot-air supply speed to the moving speed of the porous substrate per unit transit time in the hot-air dryer is from 2.2 to 5.0.

13 Claims, 4 Drawing Sheets

(51) Int. Cl.
*H01M 50/426* (2021.01)
*H01M 50/434* (2021.01)
*H01M 50/446* (2021.01)
*H01M 50/449* (2021.01)

(52) U.S. Cl.
CPC ....... *H01M 50/434* (2021.01); *H01M 50/446* (2021.01); *H01M 50/449* (2021.01)

(58) Field of Classification Search
USPC ........... 429/144, 251, 254; 42/144, 251, 254
See application file for complete search history.

(56) References Cited

U.S. PATENT DOCUMENTS

| | | | | |
|---|---|---|---|---|
| 2004/0053122 | A1* | 3/2004 | Sugiyama | H01M 50/426 |
| | | | | 429/144 |
| 2009/0130547 | A1 | 5/2009 | Lee et al. | |
| 2009/0142657 | A1* | 6/2009 | Yen | H01M 50/429 |
| | | | | 429/145 |
| 2010/0167124 | A1* | 7/2010 | Seo | H01M 50/46 |
| | | | | 429/212 |
| 2016/0268571 | A1* | 9/2016 | Honda | H01M 50/451 |
| 2016/0293999 | A1* | 10/2016 | Kim | H01M 50/411 |
| 2017/0033348 | A1* | 2/2017 | Murakami | H01M 4/661 |
| 2018/0358597 | A1 | 12/2018 | Liao et al. | |
| 2019/0013504 | A1* | 1/2019 | Choi | H01M 50/451 |
| 2019/0131604 | A1* | 5/2019 | Yoon | H01M 50/403 |
| 2019/0319244 | A1* | 10/2019 | Cui | H01M 50/423 |
| 2020/0251786 | A1* | 8/2020 | Kawai | H01M 10/0413 |

FOREIGN PATENT DOCUMENTS

| | | | | | |
|---|---|---|---|---|---|
| JP | | 2017147050 | A | * | 8/2017 | |
| JP | | 2017183212 | A | * | 10/2017 | ............ C08J 5/2237 |
| KR | 10-2009-0050686 | A | | 5/2009 | |
| KR | | 2011097715 | A | * | 8/2011 | ............ C08J 5/2281 |
| KR | | 10-1297768 | B1 | | 8/2013 | |
| KR | 10-2014-0014493 | | | 2/2014 | |
| KR | 10-2016-0075292 | | | 6/2016 | |
| KR | 10-2017-0010664 | | | 2/2017 | |
| KR | 10-2017-0113145 | | | 10/2017 | |
| KR | 10-2018-0060519 | A | | 6/2018 | |
| KR | 10-2019-0008851 | A | | 1/2019 | |
| WO | WO-2018030797 | A1 | * | 2/2018 | ........ H01M 10/0525 |

OTHER PUBLICATIONS

Korean Office Action, Application No. 10-2020-0029164, issued on Oct. 7, 2022, 78 pages.

* cited by examiner

METHOD FOR PREPARING COMPOSITE SEPARATOR INCLUDING CONTROLLING AMOUNT OF NON-SOLVENT SUPPLIED DURING HOT-AIR DRYING, COMPOSITE SEPARATOR INCLUDING POROUS SUBSTRATE WITH FLUORINE-BASED RESIN POROUS LAYER WITH MORE SMALL-DIAMETER PORES THAN LARGE-DIAMETER PORES, AND LITHIUM BATTERY COMPRISING COMPOSITE SEPARATOR

CROSS-REFERENCE TO RELATED APPLICATION

This application claims priority to and the benefit of Korean Patent Application No. 10-2020-0029164, filed on Mar. 9, 2020, in the Korean Intellectual Property Office, the entire content of which is incorporated herein by reference.

BACKGROUND

1. Field

One or more aspects of embodiments of the present disclosure relate to a composite separator, a method of preparing the composite separator, and a lithium battery including the composite separator.

2. Description of Related Art

With the development of various compact and high-performance devices, there is an increasing demand for compact and lightweight lithium batteries. The discharge capacity, energy density, and cycle characteristics of lithium batteries are important factors for use in electric vehicles. To meet requirements for such applications, lithium batteries, having high discharge capacity per unit volume, high energy density, and/or excellent lifespan characteristics, are desired.

A separator is interposed between a positive electrode and a negative electrode in a lithium battery to prevent or reduce short-circuits therebetween. An electrode assembly including a positive electrode, a negative electrode, and a separator interposed between the positive electrode and the negative electrode is wound in a jelly roll shape.

A separator prepared by applying a coating layer including inorganic particles to one side of a porous olefin-based polymer substrate has been utilized in a jelly roll shape. The inorganic particles may improve a heat resistance of the separator, but reduce an adhesive strength (e.g., peel strength) thereof. Thus, side reactions (such as generation of dead (for example, electrochemically inactive) lithium) may be accelerated due to delamination of the coating layer including inorganic particles during charging and/or discharging, and thus cycle characteristics of lithium batteries may deteriorate. Therefore, there is a need for an improved separator, and a method of preparing a separator capable of providing enhanced adhesive strength and/or improved cycle characteristics.

SUMMARY

One or more aspects of embodiments of the present disclosure are directed toward a method of preparing a composite separator having enhanced adhesion force and a constant pore size ratio.

One or more aspects of embodiments of the present disclosure are directed toward a composite separator having enhanced adhesion force and a constant pore size ratio.

One or more aspects of embodiments of the present disclosure are directed toward a lithium battery including the composite separator.

Additional aspects will be set forth in part in the description which follows and, in part, will be apparent from the description, or may be learned by practice of the presented embodiments of the disclosure.

One or more embodiments of the present disclosure provide a method of preparing a composite separator, the method including:
coating a binder composition on one side or both sides of a porous substrate;
hot-air drying the porous substrate coated with the binder composition; and
supplying a non-solvent during the hot-air drying, wherein the composite separator includes a porous layer on the one side or both sides of the porous substrate,
the binder composition includes a good-solvent, a binder, and inorganic particles,
an amount of the non-solvent supplied during hot-air drying is from 12 $g/m^3$ to 17 $g/m^3$, and
a ratio (e) of the hot-air supply speed to the moving speed of the porous substrate per unit transit time of the porous substrate in the hot-air dryer, as represented by Equation 1, is from 2.2 to 5.0:

$$E[s^{-1}]=[\text{hot-air supply speed/moving speed of porous substrate]/transit time of porous substrate in dryer.} \quad \text{Equation 1}$$

One or more embodiments of the present disclosure provide a composite separator including:
a porous substrate; and a porous layer located on one side or both sides of the porous substrate,
wherein the porous layer includes a fluorine-based binder and inorganic particles,
a ratio (a/b) of the number of pores having a diameter of 500 nm to 1000 nm per 1 $\mu m^2$ of the porous layer (a) to the number of pores having a diameter less than 500 mm per 1 $\mu m^2$ of the porous layer (b) is from 0.25 to 0.85,
an electrode assembly, including a positive electrode, a negative electrode, and the composite separator interposed between the positive electrode and the negative electrode, wound in a jelly roll shape, has a bending strength of 460 N or more, and
the porous layer has a peel strength of 0.3 N/m or more with respect to the porous substrate.

One or more embodiments of the present disclosure provide a lithium battery including an electrode assembly including:
a positive electrode; a negative electrode; and
the composite separator interposed between the positive electrode and the negative electrode,
wherein the electrode assembly is wound in a jelly roll shape.

BRIEF DESCRIPTION OF THE DRAWINGS

The and other aspects, features, and advantages of certain embodiments of the disclosure will be more apparent from description taken in conjunction with the accompanying drawings, in which.

DETAILED DESCRIPTION

Figure 1:
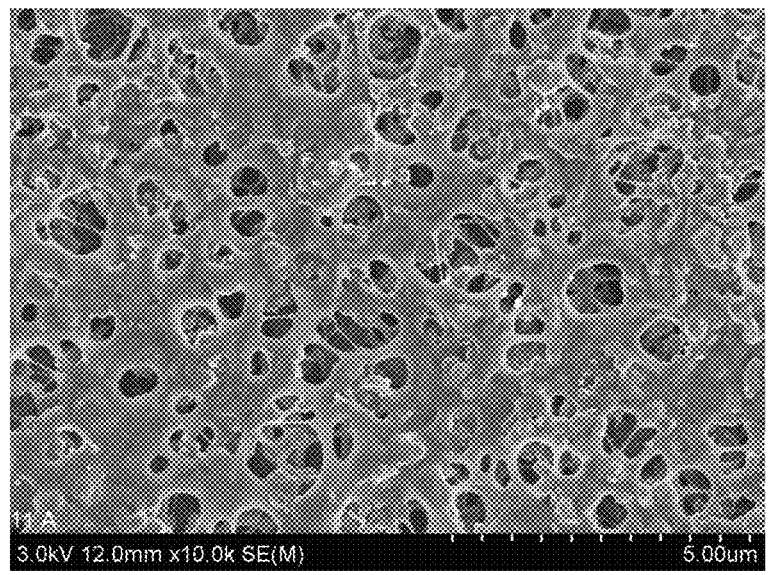
FIG. 1 is a scanning electron microscope (SEM) image of a surface of a porous layer of a composite separator prepared in Example 1.

Reference will now be made in more detail to embodiments, examples of which are illustrated in the accompanying drawings, wherein like reference numerals refer to like elements throughout, and duplicative descriptions thereof may not be provided. In this regard, the present embodiments may have different forms and should not be construed as being limited to the descriptions set forth herein. Accordingly, the embodiments are described with reference to the drawings merely to explain aspects of the present description. As used herein, the term "and/or" includes any and all combinations of one or more of the associated listed items. Expressions such as "at least one of," "one of," and "selected from," when preceding a list of elements, modify the entire list of elements and do not modify the individual elements of the list.

As the present disclosure allows for various changes and numerous embodiments, selected embodiments will be illustrated in the drawings and described in more detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure.

The terms used herein are merely used to describe particular embodiments, and are not intended to limit the present disclosure. An expression used in the singular encompasses the expression of the plural, unless it has a clearly different meaning in the context. Hereinafter, it is to be understood that the terms such as "including," "comprising," or "having," etc., are intended to indicate the existence of features, numbers, operations, components, parts, elements, materials, or combinations thereof disclosed in the specification, and are not intended to preclude the possibility that one or more other features, numbers, operations, components, parts, elements, materials, or combinations thereof may exist or may be added. As utilized herein, the "/" may be interpreted as either "and" or "or" depending on situations.

In the drawings, thicknesses of layers and regions may be enlarged or reduced for clarity. Throughout the specification, it will be understood that when one element such as layer, region, or plate, is referred to as being "on" another element, it may be directly on the other element, or intervening elements may also be present therebetween. When an element is referred to as being "directly on" another element, there are no intervening elements present. It will be understood that, although the terms first, second, etc. may be utilized herein to describe one or more suitable components, these components should not be limited by these terms. These terms are only utilized to distinguish one component from another.

As used herein, the term "good-solvent" refers to a solvent that dissolves (e.g., substantially or fully dissolves) a binder (for example, a particular or standard amount of solid binder in a particular or standard amount of solvent, expressed in g of solid per mL of solvent). A solubility of a binder in a good-solvent may be, for example, 10 g or more, 50 g or more, or 100 g per 100 mL of the good-solvent at 25° C.

Throughout the specification, the term "non-solvent" refers to a solvent that does not substantially or appreciably dissolve a binder (for example, does not meet the solubility standard described with respect to the good-solvent). A solubility of the binder in the non-solvent may be, for example, 1 g or less, 0.1 g or less, 0.01 g or less, 0.001 g or less, 0.0001 g or less, or 0 g per 100 mL of the non-solvent at 25° C.

Hereinafter, a method of preparing a composite separator, a composite separator, and a lithium battery including the composite separator according to embodiments will be described in more detail.

A method of preparing a composite separator according to an embodiment includes: coating a binder composition on one side or both sides of a porous substrate, and preparing a composite separator in which a porous layer is formed on the porous substrate by: hot-air drying the porous substrate coated with the binder composition and supplying a non-solvent during the hot-air drying, wherein the binder composition includes a good-solvent, a binder, and inorganic particles, an amount of the non-solvent supplied during the hot-air drying is from 12 g/m³ to 17 g/m³, and a ratio (e) of the hot-air supply speed to the moving speed of the porous substrate per unit transit time in the hot-air dryer, as represented by Equation 1, is from 2.2 to 5.0:

$$\text{Ratio } (e) \text{ of hot-air supply speed to moving speed of porous substrate per unit transit time } [s^{-1}] = [\text{hot-air supply speed/moving speed of porous substrate}]/\text{transit time of porous substrate in dryer} \quad \text{Equation 1}$$

In the method of preparing the composite separator, when the ratio (e) of the hot-air supply speed to the moving speed of the porous substrate per unit transit time satisfies the above range, the prepared composite separator may have both increased peel strength and increased bending strength (e.g., simultaneously). For example, because an adhesion force between the prepared composite separator and the electrode may be increased and an adhesion force between the porous layer included in the composite separator and a base porous substrate is also increased, a binding strength between the electrode and the composite separator may be enhanced, and/or an interface resistance between the electrode and the composite separator may be reduced in the lithium battery. Thus, during charging and discharging of the lithium battery including the composite separator, expansion/shrinkage of the electrode, expansion of the battery due to delamination of the electrode caused by external impact, and/or an increase in internal resistance of the battery may be prevented or reduced. In some embodiments, swelling of the binder caused by an electrolyte solution impregnating the separator and/or delamination of the porous layer from the base porous substrate caused by volume change of the electrode may also be prevented or reduced. Thus, deterioration of discharge capacity and/or cycle characteristics of the lithium battery may be inhibited or reduced by preventing or reducing a volume increase of the lithium battery caused by delamination of the porous layer, growth of lithium dendrites, and/or generation of dead lithium during charging and/or discharging of the lithium battery. Therefore, the lithium battery including the composite separator may have increased energy density and/or improved cycle characteristics.

Hereinafter, an explanation of why the composite separator prepared according to the method herein has improved physical properties is described. However, the description is intended to aid understanding of the present disclosure and does not limit the scope of the present disclosure.

When the ratio (e) of the hot-air supply speed to the moving speed of the porous substrate per unit transit time is less than 2.2, for example, drying of the porous layer may proceed too rapidly in the dryer due to the high moving speed of the porous substrate. Thus, the inorganic particles may be distributed in the porous layer mainly in the vicinity of the surface of the porous layer facing the electrode, and the peel strength of the prepared separator may increase while the bending strength may decrease. For example, the adhesion force between the prepared composite separator and the electrode may decrease. When the ratio (e) of the hot-air supply speed to the moving speed of the porous substrate per unit transit time is greater than 5, for example, drying of the porous layer may proceed too slowly in the dryer due to the low moving speed of the porous substrate. Thus, the inorganic particles may be distributed in the porous layer mainly in the vicinity of the interface between the porous layer and the porous substrate, and the bending strength of the prepared separator may increase while the peel strength may decrease. For example, the adhesion force between the porous layer and the porous substrate included in the prepared composite separator may decrease.

For example, when the ratio (e) of the hot-air supply speed to the moving speed of the porous substrate per unit transit time is too high or too low, the inorganic particles may be distributed in the porous layer mainly in the vicinity of one of the two opposing surface (sides) of the porous layer. Thus, the physical properties of the composite separator may be deteriorated.

An amount of the non-solvent supplied to the dryer during the hot-air drying may be for example, from 12 g/m$^3$ to 17 g/m$^3$, from 13 g/m$^3$ to 17 g/m$^3$, from 14 g/m$^3$ to 17 g/m$^3$, or from 14 g/m$^3$ to 16 g/m$^3$. When the non-solvent is water, an amount of water vapor (e.g., water vapor present during the hot-air drying) may be calculated by multiplying an amount of saturated water vapor by a relative humidity at a given temperature. By controlling the relative humidity in the dryer, the amount of water vapor (e.g., gaseous non-solvent) in the dryer may be adjusted. When the amount of the non-solvent in the dryer is less than 12 g/m$^3$, the bending strength of the composite separator may decrease, and thus the electrode may be easily delaminated from the composite separator. When the amount of the non-solvent in the dryer is greater than 17 g/m$^3$, the peel strength may decrease, and thus the porous layer may be easily delaminated from the porous substrate. When the amount of the non-solvent in the dryer is within the above range, a composite separator having both (e.g., simultaneously) increased bending strength and increased peel strength may be prepared.

First, the binder composition is coated on one side or both sides of the moving porous substrate.

Methods for coating the binder composition on one side or both sides of the moving porous substrate are not particularly limited, for example, at least one method selected from a forward roll coating method, a reverse roll coating method, a microgravure coating method, and a direct metering coating method may be utilized, without being limited thereto. The coating method may be, for example, the direct metering coating method. A coating speed for coating the binder composition on both sides of the moving porous substrate may be, for example, from 9 m/s to 27 m/s, from 10 m/s to 25 m/s, or from 10 m/s to 20 m/s. When the coating speed of the binder composition is within the ranges above, a composite separator having both (e.g., simultaneously) increased bending strength and increased peel strength may be prepared.

Subsequently, the porous substrate coated with the binder composition is transferred into the dryer.

In the dryer, the porous substrate coated with the binder composition is dried by hot-air, and the composite separator (in which the porous layer is formed on the porous substrate) is prepared. The porous substrate coated with the binder composition is supplied into one side of the dryer, dried in the dryer by hot-air, and discharged out of the other side of the dryer. In the dryer, hot-air may be supplied from upper and lower nozzles, which may be alternatingly or symmetrically aligned above and below the porous substrate coated with the binder composition.

In the dryer, the moving speed of the porous substrate may be, for example, from 0.15 m/s to 0.45 m/s, from 0.15 m/s to 0.40 m/s, or from 0.15 m/s to 0.35 m/s. When the moving speed of the porous substrate is too low, the inorganic particles included in the binder composition may be mainly distributed in the interface between the porous layer and the porous substrate, thereby decreasing the adhesion force between the porous layer and the porous substrate. When the moving speed of the porous substrate is too high, the inorganic particles may be distributed in the porous layer mainly in the vicinity of the surface of the porous layer facing the electrode, thereby decreasing the adhesion force between the composite separator and the electrode.

For example, when the moving speed of the porous substrate is too high or too low, the inorganic particles may be distributed in the porous layer mainly in the vicinity of one of the two opposing surfaces of the porous layer. Thus, the physical properties of the composite separator may be deteriorated.

In the dryer, a hot-air supply speed is, for example, from 10 m/s to 50 m/s, from 10 m/s to 40 m/s, from 10 m/s to 30 m/s, or from 10 m/s to 20 m/s. When the hot-air supply speed is within this range, a composite separator having both (e.g., simultaneously) increased bending strength and increased peel strength may be prepared. When the hot-air supply speed is too low, the inorganic particles included in the binder composition may be mainly distributed in the interface between the porous layer and the porous substrate, and thus the bending strength (adhesion force) between the porous layer and the porous substrate may decrease. When the hot-air supply speed is too high, the inorganic particles may be distributed in the porous layer mainly in the vicinity of the surface of the porous layer facing the electrode, and thus the binding strength (adhesion force) between the composite separator and the electrode may decrease.

For example, when the hot-air supply speed is too high or too low, the inorganic particles may be distributed in the porous layer mainly in the vicinity of one of the two opposing surfaces of the porous layer. Thus, the physical properties of the composite separator may be deteriorated.

In the dryer, the hot-air drying temperature may be, for example, from 30° C. to 80° C., from 35° C. to 75° C., from 40° C. to 70° C., or from 45° C. to 65° C. When the hot-air drying temperature is within the ranges above, a composite separator having both (e.g., simultaneously) increased bending strength and increased peel strength may be prepared.

When the hot-air drying temperature is too low, drying may be incomplete. When the hot-air drying temperature is too high, the porous layer may not have a substantially uniform structure due to rapid volatilization of the solvent.

In the dryer, the transit time of the porous substrate may be, for example, from 10 seconds to 50 seconds, from 10 seconds to 45 seconds, from 10 seconds to 40 seconds, from 10 seconds to 35 seconds, or from 10 seconds to 30 seconds. When the transit time in the dryer is within the ranges above, a composite separator having both (e.g., simultaneously) increased bending strength and increased peel strength may be prepared. When the transit time of the porous substrate in the dryer is too short, the binder may not be distributed on the surface of the porous layer. When the transit time of the porous substrate in the dryer is too long, the porous base substrate may shrink.

The non-solvent supplied into the dryer during the hot-air drying may include at least one selected from water and alcohol. The non-solvent may be, for example, water vapor. The alcohol may be, for example, methanol, ethanol, or propanol.

The binder included in the binder composition may include, for example, at least one selected from polyvinylidene fluoride, a polyvinylidene fluoride-hexafluoropropylene copolymer, a polyvinylidene fluoride-trichloroethylene copolymer, a polyvinylidene fluoride-chlorotrifluoroethylene copolymer, polymethylmethacrylate, polyacrylonitrile, polyvinylpyrrolidone, polyvinyl acetate, ethylene vinyl acetate copolymer, polyethylene oxide, cellulose acetate, cellulose acetate butylate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile styrene butadiene copolymer, and polyimide.

The binder composition may include a fluorine-based binder. The fluorine-based binder may be a binder in which some or all hydrogen atoms bound to carbon atoms are substituted with fluorine atoms. For example, the fluorine-based binder may be a polymer including a repeating unit derived from at least one monomer selected from a vinylidene fluoride monomer, a tetrafluoroethylene monomer, and a hexafluoropropylene monomer. The fluorine-based binder may be, for example, a fluorine-based homopolymer or a fluorine-based copolymer.

The fluorine-based binder included in the binder composition may be, for example, a copolymer of a tetrafluoroethylene monomer and another monomer. The monomer utilized together with the tetrafluoroethylene monomer may be at least one fluorine-containing monomer selected from vinylidene fluoride, hexafluoropropylene, chlorotrifluoroethylene, and perfluoroalkylvinyl ether. The fluorine-based binder may be, for example, a tetrafluoroethylene-vinylidene fluoride copolymer, a tetrafluoroethylene-hexafluoropropylene copolymer, a tetrafluoroethylene-chlorotrifluoroethylene copolymer, or a tetrafluoroethylene-perfluoroalkylvinyl ether. An amount of the tetrafluoroethylene monomer included in the fluorine-based binder may be, for example, 10 mol % or more, 30 mol % or more, 50 mol % or more, 70 mol % or more, or 90 mol % or more. In some embodiments, the fluorine-based binder included in the binder composition may be, for example, a copolymer of a vinylidene fluoride monomer and another monomer. The fluorine-based binder may be, for example, a copolymer of a vinylidene fluoride monomer and at least one fluorine-containing monomer selected from hexafluoropropylene, chlorotrifluoroethylene, fluorovinyl, and perfluoroalkylvinyl ether. For example, the vinylidene-based monomer may be a vinylidene fluoride homopolymer, a vinylidene fluoride-hexafluoropropylene copolymer, a vinylidene fluoride-chlorotrifluoroethylene copolymer, and/or the like. An amount of the vinylidene fluoride-based monomer included in the fluorine-based binder may be, for example, 50 mol % or more, 60 mol % or more, 70 mol % or more, 80 mol % or more, or 90 mol % or more.

The fluorine-based binder included in the binder composition may be, for example, polyvinylidene fluoride, a polyvinylidene fluoride-hexafluoropropylene copolymer, a polyvinylidene fluoride-trichloroethylene copolymer, a polyvinylidene fluoride-chlorotrifluoroethylene copolymer, a polytetrafluoroethylene, and/or the like. The fluorine-based binder included in the binder composition may be, for example, a vinylidene fluoride-hexafluoropropylene copolymer. The vinylidene fluoride-hexafluoropropylene copolymer included in the binder composition may have a glass transition temperature of $-10°$ C. or lower and a melting point of 150° C. or higher. In the specification, for example, the glass transition temperature of the binder or (co)polymer can be measured by Differential Scanning Calorimetry (DSC). For example, the melting point of the binder or (co)polymer can be measured by Differential Scanning Calorimetry (DSC).

The vinylidene fluoride-hexafluoropropylene copolymer included in the binder composition may have a glass transition temperature of, for example, $-10°$ C. or lower, $-15°$ C. or lower, $-20°$ C. or lower, or $-25°$ C. or lower. The vinylidene fluoride-hexafluoropropylene copolymer may have a glass transition temperature of, for example, $-80°$ C. or higher, $-60°$ C. or higher, $-50°$ C. or higher, or $-40°$ C. or higher. The vinylidene fluoride-hexafluoropropylene copolymer may have a glass transition temperature of, for example, $-80°$ C. to $-10°$ C., $-60°$ C. to $-15°$ C., $-50°$ C. to $-40°$ C., or $-40°$ C. to $-25°$ C. When the glass transition temperature of the vinylidene fluoride-hexafluoropropylene copolymer is too low, crystallinity of the copolymer may deteriorate, leading to excessive swelling with respect to the electrolytic solution resulting in a decrease in bending strength. When the glass transition temperature of the vinylidene fluoride-hexafluoropropylene copolymer is too high, crystallinity of the copolymer is enhanced leading to negligible swelling with respect to the electrolytic solution resulting in a decrease in bending strength.

The vinylidene fluoride-hexafluoropropylene copolymer included in the binder composition may have a melting point of, for example, 100° C. or higher, 120° C. or higher, 130° C. or higher, or 140° C. or higher. The vinylidene fluoride-hexafluoropropylene copolymer may have a melting point of, for example, 200° C. or lower, 190° C. or lower, 180° C. or lower, or 170° C. or lower. The vinylidene fluoride-hexafluoropropylene copolymer may have a melting point of, for example, 100° C. to 200° C., 120° C. to 190° C., 130° C. to 180° C., or 140° C. to 170° C. When the glass transition temperature of the vinylidene fluoride-hexafluoropropylene copolymer is too low, the crystallinity of the copolymer may deteriorate, leading to excessive swelling with respect to the electrolytic solution, and resulting in a decrease in bending strength. When the glass transition temperature of the vinylidene fluoride-hexafluoropropylene copolymer is too high, the crystallinity of the copolymer may be enhanced, leading to negligible swelling with respect to the electrolytic solution, and resulting in a decrease in bending strength.

In the vinylidene fluoride-hexafluoropropylene copolymer included in the binder composition, an amount of hexafluoropropylene may be, for example, 1 mol % or more, 3 mol % or more, or 5 mol % or more. The amount of hexafluoropropylene included in the vinylidene fluoride-hexafluoropropylene copolymer may be, for example, 20 mol % or less, 17 mol % or less, or 15 mol % or less. The amount of hexafluoropropylene included in the vinylidene fluoride-hexafluoropropylene copolymer may be, for example, from 1 mol % to 20 mol %, from 3 mol % to 17 mol %, or from 5 mol % to 15 mol %. When the amount of hexafluoropropylene is too low, the crystallinity of the copolymer may be enhanced, leading to negligible swelling with respect to the electrolytic solution, and resulting in a decrease in bending strength. When the amount of hexafluoropropylene is too high, the crystallinity of the copolymer may deteriorate, leading to excessive swelling with respect to the electrolytic solution, and resulting in a decrease in bending strength.

The fluorine-based binder included in the binder composition may include, for example, a hydrophilic group (such as a polar functional group). The hydrophilic functional group further included in the fluorine-based binder of the binder composition may include at least one selected from a carboxylic acid group, a sulfonic acid group, a phosphoric acid group, an acid anhydride group, a hydroxyl group, and salts thereof. However, embodiments are not limited thereto, and any substance available in the art as the hydrophilic function group of the fluorine-based binder may also be utilized.

The introduction (e.g., inclusion) of a polar functional group (i.e., the hydrophilic functional group) into the fluorine-based binder included in the binder composition may be performed, for example, by adding a monomer including at least one selected from a carboxylic acid group, a sulfonic acid group, a phosphoric acid group, an acid anhydride group, a hydroxyl group, and a salt thereof to the fluorine-containing monomer mixture, and performing polymerization.

The monomer including a carboxylic acid group may be a monocarboxylic acid or a derivative thereof, a dicarboxylic acid or a derivative thereof, and/or the like. Non-limiting examples of the monocarboxylic acid may include acrylic acid, methacrylic acid, and/or crotonic acid. Non-limiting examples of the derivative of monocarboxylic acid may include 2-ethylacrylic acid, isocrotonic acid, α-acetoxyacrylic acid, β-trans-aryloxyacrylic acid, α-chloro-β-E-methoxy acrylic acid, and/or β-diaminoacrylic acid. Non-limiting examples of the dicarboxylic acid may include maleic acid, fumaric acid, and/or itaconic acid. Non-limiting examples of the derivative of dicarboxylic acid may include a malic acid methyl allyl (such as methylmaleic acid, dimethylmaleic acid, phenylmaleic acid, chloromaleic acid, dichloromaleic acid, and/or fluoromaleic acid), and a maleic acid salt (such as maleic acid diphenyl, maleic acid nonyl, maleic acid decyl, maleic acid dodecyl, maleic acid octadecyl, and/or maleic acid fluoroalkyl). In some embodiments, an acid anhydride that can generate a carboxyl group by hydrolysis may also be utilized. Non-limiting examples of a dicarboxylic acid anhydride may include maleic acid anhydride, acrylic acid anhydride, methyl maleic acid anhydride, and/or dimethyl maleic acid anhydride. In some embodiments, a monoester or a diester of an α,β-ethylenically unsaturated polycarboxylic acid (such as maleic acid-monoethyl, maleic acid diethyl, maleic acid monobutyl, maleic acid dibutyl, fumaric acid monoethyl, fumaric acid diethyl, fumaric acid monobutyl, fumaric acid dibutyl, fumaric acid monocyclohexyl, fumaric acid dicyclohexyl, itaconic acid monoethyl, itaconic acid diethyl, itaconic acid monobutyl, and/or itaconic acid dibutyl) may be utilized. Non-limiting examples of the monomer including a sulfonic acid group may include vinyl sulfonic acid, methylvinyl sulfonic acid, (meth)allyl sulfonic acid, styrene sulfonic acid, (meth)acrylic acid-2-sulfonic acid ethyl, 2-acrylamide-2-methylpropane sulfonic acid, and/or 3-allyloxy-2-hydroxypropane sulfonic acid. Non-limiting examples of the monomer including a phosphoric acid group may include 2-(meth)acryloyloxyethyl phosphate, methyl-2-(meth)acryloyloxyethyl phosphate, and/or ethyl-(meth)acryloyloxyethyl phosphate. Non-limiting examples of the monomer including a hydroxyl group may include an ethylenically unsaturated alcohol (such as (meth)allyl alcohol, 3-butene-1-ol and/or 5-hexene-1-ol); an alkanol ester of an ethylenically unsaturated carboxylic acid (such as 2-hydroxyethyl acrylic acid, 2-hydroxypropyl acrylic acid, 2-hydroxyethyl methacrylic acid, 2-hydroxypropyl methacrylic acid, di(2-hydroxyethyl) maleic acid, di(4-hydroxybutyl) maleic acid, and/or di(2-hydroxypropyl) itaconic acid); an ester of a polyalkylene glycol represented by a general formula of $CH_2=CR^1—COO—(C_nH_{2n}O)_m—H$ (where m is an integer from 2 to 9, n is an integer from 2 to 4, and $R^1$ is hydrogen or methyl group) and/or (meth)acrylic acid; a mono(meth)acrylic acid ester of dihydroxy ester of dicarboxylic acid (such as 2-hydroxyethyl-2'-(meth)acryloyl oxyphthalate, and/or 2-hydroxyethyl-2'-(meth)acryloyloxysuccinate); a vinyl ether (such as 2-hydroxyethylvinyl ether and/or 2-hydroxypropylvinyl ether); a mono(meth)allyl ether of alkylene glycol (such as (meth)allyl-2-hydroxyethyl ether, (meth)allyl-2-hydroxypropyl ether, (meth)allyl-3-hydroxypropyl ether, (meth)allyl-2-hydroxy butyl ether, (meth)allyl-3-hydroxybutyl ether, (meth)allyl-4-hydroxybutyl ether, and/or (meth)allyl-6-hydroxyhexyl ether); a polyoxyalkylene glycol (meth)monoallyl ether (such as diethylene glycol mono(meth)allyl ether and/or dipropyleneglycol mono(meth)allyl ether); a halogenated mono(meth)allyl ether or a hydroxy substituted (poly)alkylene glycol (such as glycerin mono(meth)allyl ether, (meth)allyl-2-chloro-3-hydroxypropyl ether, and/or (meth)allyl-2-hydroxy-3-chloropropyl ether); a mono(meth)allyl ether of polyhydric phenol (such as eugenol, isoeugenol, and halogenated derivatives thereof); and/or (meth)allyl thioethers of alkylene glycol (such as (meth)allyl-2-hydroxyethyl thioether and/or (meth)allyl-2-hydroxypropyl thioether). In some embodiments, the hydrophilic group may be a carboxylic acid group and/or a sulfonic acid group due to a high adhesion force with an electrode active material layer. For example, a carboxylic acid group may be utilized due to its ability to trap (e.g., form a complex with) transition metal ions eluted from a positive active material layer with high efficiency.

For example, the vinylidene fluoride-hexafluoropropylene copolymer included in the binder composition may include, for example, a hydrophilic group. Due to the inclusion of the hydrophilic group, the vinylidene fluoride-hexafluoropropylene copolymer may be strongly bound to an active material on the surface of the electrode or to a binder component inside the electrode via, for example, hydrogen bonds. The hydrophilic group included in the vinylidene fluoride-hexafluoropropylene copolymer may be a hydroxyl group, a carboxyl group, a sulfonic acid group, and/or a salt thereof.

The hydrophilic group included in the vinylidene fluoride-hexafluoropropylene copolymer may for example be a carboxyl group (—COOH), a carboxylic acid ester group, and/or the like. For example, in the preparation of the vinylidene fluoride-hexafluoropropylene copolymer, the hydrophilic group may be introduced into a main chain thereof by copolymerization of a monomer having a hydrophilic group (such as maleic anhydride, maleic acid, maleic acid ester, and/or maleic acid monomethyl ester), and/or may be introduced into a side chain by grafting. An amount of the hydrophilic group (e.g., inclusion amount or proportion in the copolymer) may be measured by utilizing Fourier-transform infrared spectroscopy (FT-IR), nuclear magnetic resonance (NMR), titration, and/or the like. For example, in the case of the carboxylic acid group, the amount of the hydrophilic group may be calculated from an absorption intensity ratio of a C—H stretching vibration to a C═O stretching vibration of the carboxyl group based on the homopolymer by FT-IR. The amount of the hydrophilic group included in the vinylidene fluoride-hexafluoropropylene copolymer may be, for example, 0.1 mol % or more, 0.2 mol % or more, or 0.3 mol % or more. The amount of the hydrophilic group included in the vinylidene fluoride-hexafluoropropylene copolymer may be, for example, 5 mol % or less, 3 mol % or less, or 1 mol % or less. The amount of the hydrophilic group included in the vinylidene fluoride-hexafluoropropylene copolymer may be, for example, from 0.1 mol % to 3 mol %, from 0.2 mol % to 2 mol %, or from 0.3 mol % to 1 mol %. When the amount of the hydrophilic group is too low (e.g., below the above ranges), the crystallinity of the copolymer may be enhanced, leading to negligible swelling with respect to the electrolytic solution and resulting in a decrease in bending strength. When the amount of the hydrophilic group is too high, the crystallinity of the copolymer may deteriorate, leading to excessive swelling with respect to the electrolytic solution and resulting in a decrease in bending strength.

A weight average molecular weight of the vinylidene fluoride-hexafluoropropylene copolymer included in the binder composition may be, for example, from 500,000 Daltons (Da) to 1,200,000 Da, from 700,000 Da to 1,200,000 Da, from 750,000 Da to 1,150,000 Da, or from 800,000 Da to 1,000,000 Da. When the weight average molecular weight of the vinylidene fluoride-hexafluoropropylene copolymer is within the ranges above, the time taken to dissolve the vinylidene fluoride-hexafluoropropylene copolymer in a solvent may decrease, resulting in an increase in production efficiency. Also, when the weight average molecular weight of the vinylidene fluoride-hexafluoropropylene copolymer is within the ranges above, a constant gel strength may be maintained after swelling of the vinylidene fluoride-hexafluoropropylene copolymer with respect to the electrolytic solution, resulting in an increase in bending strength. In some embodiments, throughout the specification, the weight average molecular weight may be measured by gel permeation chromatography and calculated as a polystyrene-equivalent value.

The binder composition may include particles. When the binder composition includes particles, the porous layer formed of the binder composition includes particles. The possibility of short-circuits between the positive electrode and the negative electrode may decrease because the porous layer includes particles, thereby improving stability of the battery. The particles included in the binder composition may be or include inorganic particles and/or organic particles. The inorganic particles may include a metal oxide, a metalloid oxide, or any combination thereof. For example, the inorganic particles may be or include alumina, titania, boehmite, barium sulfate, calcium carbonate, calcium phosphate, amorphous silica, crystalline glass particles, kaolin, talc, silica-alumina composite oxide particles, calcium fluoride, lithium fluoride, zeolite, molybdenum sulfide, mica, magnesium oxide, and/or the like. The inorganic particles may be or include, for example, $Al_2O_3$, $SiO_2$, $TiO_2$, $SnO_2$, $CeO_2$, NiO, CaO, ZnO, MgO, $ZrO_2$, $Y_2O_3$, $SrTiO_3$, $BaTiO_3$, $MgF_2$, $Mg(OH)_2$ or any combination thereof. In consideration of crystal growth and the economic feasibility of the vinylidene fluoride-hexafluoropropylene copolymer, the inorganic particles may be or include particles of alumina, titania, boehmite, barium sulfate, or any combination thereof. The inorganic particles may have a spherical, plate, and/or fibrous shape, without being limited thereto, and any shape commonly utilized in the art may also be utilized. The plate shaped inorganic particles may be, for example, particles of alumina and/or boehmite. In this case, shrinkage of the area of the separator is further inhibited at a high temperature, and the separator may have a relatively high porosity, so that the lithium battery may have improved properties in a penetration test. When the inorganic particles have a plate and/or fibrous shape, an aspect ratio of the inorganic particles may be from about 1:5 to about 1:100. For example, the aspect ratio may be in the range of about 1:10 to about 1:100. For example, the aspect ratio may be in the range of about 1:5 to about 1:50. For example, the aspect ratio may be in the range of about 1:10 to about 1:50. In a flat surface of the inorganic particles having the plate shape, a ratio of the major axis to the minor axis may be from 1 to 3. For example, the ratio of the major axis to the minor axis on the flat surface may be from 1 to 2. For example, the ratio of the major axis to the minor axis on the flat surface may be about 1. The aspect ratio and the ratio of the major axis to the minor axis may be measured by utilizing a scanning electron microscope (SEM). When the aspect ratio and the ratio of the major axis to the minor axis are within the above ranges, shrinkage of the separator may be inhibited, relatively improved porosity may be obtained, and penetration properties of the lithium battery may be improved. When the inorganic particles each have a plate shape, an average angle between one side of the porous substrate and the flat surface of the inorganic particles may be from 0 degree to 30 degrees. For example, the angle between the one side of the porous substrate and the flat surface of the inorganic particles may converge to 0 degrees. That is, one side of the porous substrate may be parallel to the flat surface of the inorganic particles. For example, when the average angle between the one side of the porous substrate and the flat surface of the inorganic particles is within the range described above, thermal shrinkage of the porous substrate may be efficiently prevented or reduced, so that a separator having reduced shrinkage may be provided. The organic particles may be a cross-linked polymer. The organic particles may be a highly cross-linked polymer not having a glass transition temperature (Tg). When the highly cross-linked polymer is utilized, heat resistance may be improved, so that shrinkage of the porous substrate may efficiently be inhibited at a high temperature. Non-limiting examples of the organic particles may include a styrene-based compound and a derivative thereof, a methylmethacrylate-based compound and a derivative thereof, an acylate-based compound and a derivative thereof, a diallyl phthalate-based compound and a derivative thereof, a polyimide-based compound and a derivative thereof, a polyurethane-based compound and a derivative thereof, a copolymer thereof, or any combination thereof, without being limited thereto, and any organic particles commonly utilized in the art may also be utilized. For example, the organic particles may be particles of cross-linked polystyrene and/or cross-linked polymethylmethacrylate. The particles may be secondary particles, each aggregated from primary particles. Because porosity of the porous layer increases in a composite separator including the secondary particles, a lithium battery with high output power may be provided.

A composite separator according to another embodiment includes: a porous substrate; and a porous layer formed on one side or both sides of the porous substrate, wherein the porous layer includes a fluorine-based binder and inorganic particles, a pore size ratio (a/b) of the number of pores having a diameter of 500 nm to 1000 nm per 1 $\mu m^2$ of the porous layer (a) to the number of pores having a diameter less than 500 mm per 1 $\mu m^2$ of the porous layer (b) is from 0.25 to 0.85, an electrode assembly including a positive electrode, a negative electrode, and the composite separator interposed between the positive electrode and the negative electrode, wound in a jelly roll shape, has a bending strength of 460 N or more, and the porous layer has a peel strength of 0.3 N/m or more with respect to the porous substrate. Because the composite separator has a bending strength of 460 N or more in a form of the electrode assembly (i.e., an electrode assembly comprising the composite separator has a bending strength of 460 N or more) and a peel strength of 0.3 N/m or more which are balanced (e.g., the peel strength and bending strength are selected to be suitably and/or substantially balanced), a lithium battery including the composite separator may have increased energy density and/or improved cycle characteristics. In some embodiments, because the composite separator has a pore size ratio (a/b) of 0.25 to 0.85, an excessive increase in internal resistance and short-circuits caused by dendrite formation may be inhibited in a lithium battery prepared by rolling.

In related art separators, peel strength decreases as bending strength increases, and peel strength increases as bending strength decrease, and thus it is difficult to provide a separator having high peel strength together with high bending strength (e.g., simultaneously). On the contrary, the composite separator according to the present disclosure may provide both (e.g., simultaneously) high peel strength and high bending strength by controlling the factors in the above-described method. The bending strength of the composite separator may be, for example, 460 N or more, 465 N or more, 470 N or more, or 475 N or more when utilized in an electrode assembly such as a jelly roll assembly (i.e., an electrode assembly comprising the composite separator may be, for example, 460 N or more, 465 N or more, 470 N or more, or 475 N or more, in bending strength). A bending strength of the electrode assembly can be measured by a method disclosed in Evaluation Example 4. The bending strength of the composite separator may be, for example, from 460 N to 550 N, from 465 N to 550 N, from 470 N to 550 N, from 475 N to 550 N, or from 475 N to 545 N in a form of electrode assembly (i.e., an electrode assembly comprising the composite separator may be, for example, from 460 N to 550 N, from 465 N to 550 N, from 470 N to 550 N, from 475 N to 550 N, or from 475 N to 545 N, in bending strength). When the composite separator has a high bending strength of 460 N or more in a form of electrode assembly, the composite separator may strongly be bound to the electrode. Therefore, delamination of the separator from the electrode may be prevented or reduced during charging and discharging of the lithium battery. As a result, the lithium battery may have increased energy density and/or improved cycle characteristics. The peel strength of the composite separator may be, for example, 0.3 N/m or more, 0.35 N/m or more, 0.4 N/m or more, 0.45 N/m or more, or 0.5 N/m or more. A peel strength of the composite separator can be measured by a method disclosed in Evaluation Example 3. The peel strength of the composite separator may be, for example, from 0.3 N/m to 0.95 N/m, from 0.35 N/m to 0.90 N/m, from 0.4 N/m to 0.85 N/m, from 0.45 N/m to 0.80 N/m, or from 0.5 N/m to 0.80 N/m. When the composite separator has a high peel strength of 0.3 N/m, the porous layer may more strongly be bound to the porous substrate in the composite separator. Therefore, delamination of the porous layer from the porous substrate may be prevented or reduced during charging and discharging of the lithium battery. As a result, the lithium battery may have increased energy density and/or improved cycle characteristics. In a lithium battery including a related art separator, when the separator has a high peel strength and the lithium battery has a high bending strength, it may be difficult to inhibit an increase in internal resistance in the lithium battery. In contrast, although the composite separator according to the present disclosure has a high peel strength due to the above-described pore size ratio, and the lithium battery including the composite separator has a high bending strength, an increase in internal resistance of the lithium battery caused by rolling during the manufacturing process of the lithium battery may be inhibited, and short-circuits caused by the growth of dendrite(s) may be prevented or reduced. As a result, the lithium battery including the composite separator may have further improved cycle characteristics.

The porous substrate included in the composite separator may be a porous film including polyolefin. The polyolefin may have suitable or excellent effects on inhibiting short-circuits, and may improve battery stability by providing shut down effect. For example, the porous substrate may be a film formed of a polyolefin resin (such as polyethylene, polypropylene, polybutene, and/or polyvinyl chloride), and any mixture or copolymer thereof, but is not limited thereto, and any porous film available in the art may also be utilized. For example, a porous film formed of a polyolefin-based resin; a porous film in a woven fabric of a polyolefin-based fiber; a porous film in a non-woven fabric including polyolefin; and an aggregate of particles of an insulating material may be utilized. For example, the porous film including polyolefin may improve the coating properties of the binder composition for preparing the porous layer formed on the porous substrate, and may also decrease the thickness of the composite separator, thereby increasing a ratio of an active material in the battery (e.g., a ratio of an active material to the total material) and thus the capacity per volume.

The polyolefin utilized to form the porous substrate may be, for example, a homopolymer, a copolymer, and/or any mixture of polyethylene and polypropylene. Polyethylene may be classified into low-density, middle-density, and high-density polyethylene. In terms of mechanical strength, high-density polyethylene may be utilized. In some embodiments, at least two types (kinds) of polyethylene may be mixed to provide flexibility. A polymerization catalyst utilized in the preparation of polyethylene is not particularly limited, and a Ziegler-Natta-based catalyst, a Philips-based catalyst, a metallocene-based catalyst, and/or the like may be utilized. In order to obtain both (e.g., simultaneously) high mechanical strength and high permeation properties, a weight average molecular weight of polyethylene may be from 100,000 Dalton to 12,000,000 Dalton, for example, from 200,000 Dalton to 3,000,000 Dalton. The polypropylene may be in the form of a homopolymer, a random copolymer, or a block copolymer, and may be utilized alone or in combination of at least two thereof. In some embodiments, the polymerization catalyst is not particularly limited, and a Ziegler-Natta-based catalyst, a metallocene-based catalyst, and/or the like may be utilized. Also, tacticity is not particularly limited, and an isotactic, a syndiotactic, or an atactic polymer may be utilized, and for example, a relatively inexpensive isotactic polypropylene may be utilized.

Furthermore, additives (such as a polyolefin other than polyethylene or polypropylene, and an antioxidant) may also be added to the polyolefin within the scope of and without impairing the effect of embodiments of the present disclosure.

The porous substrate included in the composite separator may be, for example, a multi-layered film including a polyolefin (such as polyethylene and/or polypropylene) and including two or more layers. A mixed multi-layered film (such as a polyethylene/polypropylene double-layered separator, a polyethylene/polypropylene/polyethylene triple-layered separator, and/or a polypropylene/polyethylene/polypropylene triple-layered separator) may be utilized, without being limited thereto, and any materials and components available in the art as the porous substrate may also be utilized. The porous substrate included in the composite separator may include, for example, a diene-based polymer prepared by polymerizing a monomer composition including a diene-based monomer. The diene-based monomer may be a conjugated diene-based monomer or a non-conjugated diene-based monomer. For example, the diene-based monomer may include at least one selected from 1,3-butadiene, isoprene, 2-chloro-1,3-butadiene, 2,3-dimethyl-1,3-butadiene, 2-ethyl-1,3-butadiene, 1,3-pentadiene, chloroprene, vinyl pyridine, vinyl norbornene, dicyclopentadiene, and 1,4-hexadiene, without being limited thereto, and any diene-based monomer commonly utilized in the art may also be utilized.

The porous substrate included in the composite separator may have a thickness of 1 μm to 100 μm. For example, the porous substrate may have a thickness of 1 μm to 30 μm. For example, the porous substrate may have a thickness of 5 μm to 20 μm. For example, the porous substrate may have a thickness of 5 μm to 15 μm. For example, the porous substrate may have a thickness of 5 μm to 10 μm. When the thickness of the porous substrate is less than 1 μm, the mechanical properties of the composite separator may not be maintained. When the thickness of the porous substrate is greater than 100 μm, the internal resistance of the lithium battery may increase. The porosity of the porous substrate included in the composite separator may be in the range of 5% to 95%. When the porosity is less than 5%, an internal resistance of the lithium battery may increase. When the porosity is greater than 95%, the mechanical properties of the porous substrate may not be maintained. In the composite separator, the pore size of the porous substrate may be from 0.01 μm to 50 μm. For example, in the composite separator, the pore size of the porous substrate may be from 0.01 μm to 20 μm. For example, in the composite separator, the pore size of the porous substrate may be from 0.01 μm to 10 μm. When the pore size of the porous substrate is less than 0.01 μm, an internal resistance of the lithium battery may increase. When the pore size of the porous substrate is greater than 50 μm, it may be difficult to maintain mechanical properties of the porous substrate.

The porous layer may be arranged on one side or both sides of the porous substrate. The porous layer may be an organic layer including a binder and organic particles, an inorganic layer including a binder and inorganic particles, or an organic-inorganic layer including a binder, organic particles, and inorganic particles. The porous layer may be, for example, a single-layered structure or a multi-layered structure. The porous layer may be formed, for example, on one side of the porous substrate but not on the other side. The porous layer formed on only one side of the porous substrate may be an organic layer, an inorganic layer, or an organic-inorganic layer. Also, the porous layer may have a multi-layered structure. In the multi-layered porous layer, layers selected from the organic layer, the inorganic layer, and the organic-inorganic layer may be arbitrarily arranged. The multi-layered structure may be a double-layered structure, a triple-layered structure, or a quadruple-layered structure, but is not limited thereto, and may be selected therefrom according to the desired characteristics of the composite separator. The porous layer may be arranged, for example, on both sides of the porous substrate. The porous layers respectively formed on both sides of the porous substrate may be each independently an organic layer, an inorganic layer, or an organic-inorganic layer. Also, one or more porous layers respectively formed on both sides of the porous substrate may be a multi-layered structure. In the multi-layered porous layer, the layers selected from the organic layer, the inorganic layer, and the organic-inorganic layer may be arbitrarily arranged. The multi-layered structure may be a double-layered structure, a triple-layered structure, or a quadruple-layered structure, but is not limited thereto, and may be selected therefrom according to required characteristics of the composite separator.

The porous layer included in the composite separator includes 0.3 to 0.4 pores having a diameter of 500 nm to 1000 nm per 1 μm$^2$, and 0.5 to 1.5 pores having a diameter less than 500 nm per 1 μm$^2$. The number of pores per unit area of a surface of the porous layer in the composite separator can be measured, for example, by a method disclosed in Evaluation Example 2. The pores having a diameter of 500 nm to 1000 nm per 1 μm$^2$ may be referred to as, for example, large-diameter pores, and the pores having a diameter less than 500 nm per 1 μm$^2$ may be referred to as, for example, small-diameter pores. When the numbers of the large-diameter pores and the small-diameter pores are within the above ranges in the composite separator, the composite separator may provide balanced air permeability.

When the number of the large-diameter pores included in the composite separator is less than 0.3, and the number of the small-diameter pores is greater than 0.15, the composite separator may have an unsuitably low air permeability (i.e., a too high Gurley value). Accordingly, the internal resistance of the composite separator impregnated with the electrolytic solution may increase, resulting in deteriorated cycle characteristics of a lithium battery including the composite separator. When the number of the large-diameter pores included in the composite separator is greater than 0.4 and the number of the small-diameter pores is less than 0.5, the composite separator may have an unsuitably high air permeability (i.e., a too low Gurley value). Accordingly, the composite separator may not be able to inhibit lithium dendrite(s) from growing during charging and discharging, thereby increasing the possibility of short-circuits in the lithium battery including the composite separator. The air permeability may be, for example, a Gurley air permeability defined as the time during which 100 cc of air permeates through the composite separator in accordance with JIS P-8117.

The surface of the porous layer included in the composite separator may have, for example, a morphology including a plurality of pores discontinuously arranged on a polymer film in the form of islands. Referring to FIG. 1, the surface of the porous layer included in the composite separator may have a morphology in which a plurality of pores are discontinuously arranged on the polymer film. The surface of the porous layer may be basically formed of a polymer film, and have a morphology in which pores are non-uniformly arranged on the polymer film in the form of islands. When the porous layer included in the composite separator has such a morphology, the bending strength and peel strength of the composite separator may be improved. As a result, the lithium battery including the composite separator may have increased energy density and/or improved cycle characteristics. In contrast, referring to FIG. 2, on the surface of a porous layer included in a conventional separator (e.g., Comparative Example separator) (described below), a polymer film is not observed, and instead, a morphology in which a plurality of microparticles are connected to each other to form a porous surface is observed.

The porous layer includes a binder. The binder included in the porous layer may be substantially the same as that utilized in the above-described method of preparing a composite separator. For more details about the binder included in the porous layer, refer to the descriptions given above with regard to the binder composition above.

The porous layer includes particles. The particles included in the porous layer may be substantially the same as the particles utilized in the above-described method of preparing the composite separator. For more details about the particles included in the porous layer, refer to the descriptions given above with regard to the binder composition.

An amount of the particles included in the porous layer may be 90 wt % or less, 85 wt % or less, or 80 wt % or less based on a total weight of the porous layer. The amount of the particles included in the porous layer formed from the binder composition may be 50 wt % or more, 55 wt % or more, or 60 wt % or more based on the total weight of the porous layer. The amount of the particles included in the porous layer formed from the binder composition may be from 55 wt % to 90 wt %, from 60 wt % to 85 wt %, or from 60 wt % to 80 wt % based on the total weight of the porous layer. When the amount of the particles included in the porous layer from the binder composition is within the above ranges, both (e.g., simultaneously) bending strength and peel strength of the composite separator may be increased.

The particles included in the porous layer may have an average particle diameter of 300 nm to 2 μm, 300 nm to 1.5 μm, or 300 nm to 1.0 μm. The average particle diameter of the particles may be measured by utilizing a laser diffraction method or a dynamic light scattering method. The average particle diameter of the particles may be measured utilizing, for example, a laser scattering particle size distributer (e.g., Horiba Instrument, LA-920), and may be a median particle diameter (D50) at 50% of a total cumulative particle diameter distribution of particles from the smallest particle diameter in volume. By utilizing the particles having the average particle diameter within the above ranges, both (e.g., simultaneously) binding strength between the porous layer and the porous substrate and binding strength between the porous layer and the electrode may be increased. Also, by utilizing the particles having the average particle diameter within the ranges above, a composite separator including the porous layer including the particles may have an appropriate or suitable porosity. When the average particle diameter of the particles is less than 300 nm, the mechanical properties of the composite separator may deteriorate.

Figure 3:
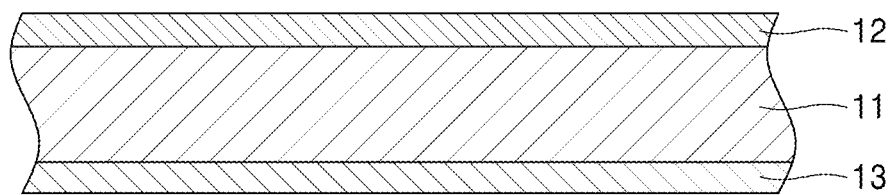
FIG. 3 is a schematic cross-sectional view of a composite separator according to an embodiment.

A thickness of the porous layer on each side may be, for example, from 0.5 μm to 3 μm, from 0.5 μm to 2.5 μm, or from 0.5 μm to 2 μm. When the thickness of the porous layer on each side is too large, the volume of the wound electrode assembly may increase. When the thickness of the porous layer on each side is too small, increased bending strength and/or peel strength may not be obtained. By arranging the porous layers on both sides of the porous substrate, the binding strength between the porous layer and the electrode may be further increased, resulting in inhibiting the volumetric changes of the lithium battery during charging and discharging. For example, referring to FIG. 3, in the composite separator, porous layers 12 and 13 including a binder and a filler may be formed on both sides of the porous substrate 11.

The porosity of the porous layer may be from 30% to 90%, from 35% to 80%, or from 40% to 70%. When the porosity of the porous layer is within the range, an increase in internal resistance of the composite separator may be inhibited, and excellent high rate characteristics and high film strength may be provided. The "porosity of the porous layer" is the volume occupied by pores in a total volume of the porous layer.

A coating amount of the porous layer (e.g., on a surface of the porous substrate) may be, for example, from 3.5 g/m$^2$ to 4.5 g/m$^2$, from 3.7 g/m$^2$ to 4.5 g/m$^2$, from 4.0 g/m$^2$ to 4.5 g/m$^2$, or from 4.1 g/m$^2$ to 4.3 g/m$^2$. When the coating amount of the porous layer is within the ranges above, a composite separator including the porous layer may provide both (e.g., simultaneously) increased peel strength and increased bending strength. When the coating amount of the porous layer is too low, the bending strength and peel strength may not increase.

The binder included in the porous layer may not have an increasing concentration gradient in (along) a direction from the interface with the porous substrate to the surface facing the electrode. For example, the binder may have a decreasing concentration gradient or a concentration gradient without a tendency to change (e.g., a constant concentration) in (along) the direction from the interface with the porous substrate to the surface facing the electrode.

A lithium battery according to another embodiment may include an electrode assembly including: a positive electrode; a negative electrode; and the above-described composite separator interposed between the positive electrode and the negative electrode, wherein the electrode assembly is wound in a jelly roll shape. Because the lithium battery includes the above-described composite separator, the adhesion force between the composite separator and the electrode(s) (positive electrode and/or negative electrode) increases, thereby preventing or reducing volume changes during charging and discharging of the lithium battery. Therefore, deterioration of the lithium battery caused by volume change of the lithium battery may be inhibited, thereby improving the lifespan characteristics of the lithium battery.

The lithium battery may be prepared according to the following method.

First, a negative active material, a conductive material, a binder, and a solvent are mixed to prepare a negative active material composition. The negative active material composition may be directly coated on a metal current collector to prepare a negative electrode plate. In some embodiments, the negative active material composition may be cast on a separate support, and then a film separated from the support may be laminated on the metal current collect to prepare a negative electrode plate. However, the negative electrode is not limited thereto, and may have any suitable form or shape.

The negative active material may be a non-carbonaceous material. For example, the negative active material may include at least one selected from a metal alloyable with lithium, an alloy of the metal, and an oxide of the metal.

For example, the negative active material may include a transition metal oxide or a non-transition metal oxide.

For example, the metal alloyable with lithium may include silicon (Si), tin (Sn), aluminum (Al), germanium (Ge), lead (Pb), bismuth (Bi), antimony (Sb), an Si—Y' alloy (where Y' is an alkali metal, an alkali earth metal, a Group 13 to 16 element excluding Si, a transition metal, a rare earth element, or any combination thereof), or an Sn—Y' alloy (where Y' is an alkali metal, an alkali earth metal, a Group 13 to 16 excluding Sn, a transition metal, a rare earth element, or any combination thereof). The element Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or any combination thereof.

For example, the transition metal oxide may be or include lithium titanium oxide, vanadium oxide, and/or lithium vanadium oxide.

For example, the non-transition metal oxide may be or include $SnO_2$ and/or $SiO_x$ (where $0<x<2$).

For example, the negative active material may be or include at least one selected from Si, Sn, Pb, Ge, Al, $SiO_x$ (where $0<x\leq2$), a $SnO_y$ (where $0<y\leq2$), $Li_4Ti_5O_{12}$, $TiO_2$, $LiTiO_3$, and $Li_2Ti_3O_7$, but is not limited thereto, and may be any suitable non-carbonaceous negative active material commonly utilized in the art.

In some embodiments, a composite material of the non-carbonaceous negative active material and a carbonaceous material may be utilized, and a carbonaceous negative active material may further be added thereto in addition to the non-carbonaceous material.

The carbonaceous material may include crystalline carbon, amorphous carbon, or any mixture thereof. Non-limiting examples of the crystalline carbon include natural graphite and/or artificial graphite that are in non-shaped, plate, flake, spherical, and/or fibrous form. Non-limiting examples of the amorphous carbon include soft carbon (carbon sintered at low temperature), hard carbon, mesophase pitch carbides, sintered corks, and/or the like.

Non-limiting examples of the conductive material include carbonaceous materials, (such as acetylene black, Ketjen black (e.g., carbon black), natural graphite, artificial graphite, carbon black, and/or carbon fiber), and/or metal-based materials (such as copper, nickel, aluminum, and/or silver in powder form and/or fiber form). Also, a conductive material (such as polyphenylene derivative) or any mixture thereof may be utilized, but are not limited thereto, and any conductive material commonly utilized in the art may also be utilized. In some embodiments, the above-described crystalline carbonaceous material may be added as a conductive material.

Non-limiting examples of the binder may include a vinylidene fluoride/hexafluoropropylene copolymer, polyvinylidene fluoride (PVDF), polyacrylonitrile, polymethylmethacrylate, polytetrafluoroethylene, any mixture thereof, and/or a styrene butadiene rubber polymer, but are not limited thereto, and any binder commonly utilized in the art may also be utilized.

Non-limiting examples of the solvent include N-methylpyrrolidone, acetone, and/or water, but are not limited thereto, and any solvent commonly utilized in the art may also be utilized.

The amounts of the negative active material, the conductive material, the binder, and the solvent utilized herein may be similar to amounts generally utilized in the art. At least one of the conductive agent, the binder, and the solvent may be omitted (e.g., not added), depending on the use and the structure of the lithium battery.

In some embodiments, the binder utilized to prepare the negative electrode may be substantially the same as the binder composition contained in the coating layer of the separator.

Then, a positive active material composition is prepared by mixing a positive active material, a conductive material, a binder, and a solvent. The positive active material composition may be directly coated on a metallic current collector and dried to prepare a positive electrode plate. In some embodiments, the positive active material composition may be cast on a separate support, and then a film separated from the support may be laminated on a metallic current collector to prepare a positive electrode plate.

The positive active material may include at least one selected from lithium cobalt oxide, lithium nickel cobalt manganese oxide, lithium nickel cobalt aluminum oxide, lithium iron phosphorus oxide, and lithium manganese oxide, but is not limited thereto, and any positive active material commonly utilized in the art may also be utilized.

Non-limiting examples of the positive active material may include one of the compounds represented by the following formulae: $Li_aA_{1-b}B'_bD_2$ (where $0.90\leq a\leq 1.8$, and $0\leq b\leq 0.5$); $Li_aE_{1-b}B'_bO_{2-c}D_c$ (where $0.90\leq a\leq 1.8$, $0\leq b\leq 0.5$, and $0\leq c\leq 0.05$); $LiE_{2-b}B'_bO_{4-c}D_c$ (where $0\leq b\leq 0.5$ and $0\leq c\leq 0.05$); $Li_aNi_{1-b-c}Co_bB'_cD_\alpha$ (where $0.90\leq a\leq 1.8$, $0\leq b\leq 0.5$, $0\leq c\leq 0.05$, and $0<\alpha\leq 2$); $Li_aNi_{1-b-c}Co_bB'_cO_{2-\alpha}F_\alpha$ (where $0.90\leq a\leq 1.8$, $0\leq b\leq 0.5$, $0\leq c\leq 0.05$, and $0<\alpha<2$); $Li_aNi_{1-b-c}Co_bB'_cO_{2-\alpha}F_2$ (where $0.90\leq a\leq 1.8$, $0<b<0.5$, $0\leq c\leq 0.05$, and $0<\alpha<2$); $Li_aNi_{1-b-c}Mn_bB'_cD_\alpha$ (where $0.90\leq a\leq 1.8$, $0\leq b\leq 0.5$, $0\leq c\leq 0.05$, and $0<\alpha\leq 2$); $Li_aNi_{1-b-c}Mn_bB'_cO_{2-\alpha}F_\alpha$ (where $0.90\leq a\leq 1.8$, $0<5$ $b\leq 0.5$, $0\leq c\leq 0.05$, and $0<\alpha<2$); $Li_aNi_{1-b-c}Mn_bB'_cO_{2-\alpha}F_2$ (where $0.90\leq a\leq 1.8$, $0\leq b\leq 0.5$, $0 c\leq 0.05$, and $0<\alpha<2$); $Li_aNi_bE_cG'_dO_2$ (where $0.90\leq a\leq 1.8$, $0\leq b\leq 0.9$, $0\leq c\leq 0.5$, and $0.001\leq d\leq 0.1$); $Li_aNi_bCo_cMn_dG'_eO_2$ (where $0.90\leq a\leq 1.8$, $0\leq b\leq 0.9$, $0\leq c\leq s$ $0.5$, $0\leq d\leq 0.5$, and $0.001\leq e\leq 0.1$); $Li_aNiG'_bO_2$ (where $0.90\leq a\leq 1.8$ and $0.001\leq b\leq 0.1$); $Li_aCoG'_bO_2$ (where $0.90\leq a\leq 1.8$ and $0.001\leq b\leq 0.1$); $Li_aMnG'_bO_2$ (where $0.90\leq a\leq 1.8$ and $0.001\leq b\leq 0.1$); $Li_aMn_2G'_bO_4$ (where $0.90\leq a\leq 1.8$ and $0.001\leq b\leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0\leq f\leq 2$); $Li_{(3-f)}Fe_2(PO_4)_3$ (where $0\leq f\leq 2$); and/or $LiFePO_4$.

In the formulae, A is Ni, Co, Mn, or any combination thereof; B' is Al, Ni, Co, Mn, Cr, Fe, Mg, Sr, V, a rear earth element, or any combination thereof; D is O, F, S, P, or any combination thereof; E is Co, Mn, or any combination thereof; F is F, S, P, or any combination thereof; G' is Al, Cr, Mn, Fe, Mg, La, Ce, Sr, V, or any combination thereof; Q is Ti, Mo, Mn, or any combination thereof; I' is Cr, V, Fe, Sc, Y, or any combination thereof; and J is V, Cr, Mn, Co, Ni, Cu, or any combination thereof.

The above-described compound, the above-described compound having a coating layer on the surface thereof, or a mixture of the above-described compound and a compound having a coating layer may be utilized. The coating layer may include a compound of a coating element (such as an oxide, a hydroxide, an oxyhydroxide, an oxycarbonate, and/or a hydroxycarbonate of the coating element). The compound constituting the coating layer may be amorphous or crystalline. The coating element included in the coating layer may be Mg, Al, Co, K, Na, Ca, Si, Ti, V, Sn, Ge, Ga, B, As, Zr, or any mixture thereof. Any coating method that does not adversely affect the physical properties of the positive active material (e.g., spray coating and/or immersing), may be utilized as a process of forming the coating layer. These methods are understood by those of ordinary skill in the art, and thus detailed descriptions thereof will not be given.

For example, the positive active material may include $LiNiO_2$, $LiCoO_2$, $LiMn_xO_{2x}$ (where x=1, 2), $LiNi_{1-x}Mn_xO_2$ (where $0<x<1$), $LiNi_{1-x-y}Co_xMn_yO_2$ (where $0 \leq x \leq 0.5$ and $0 \leq y \leq 0.5$), $LiNi_{1-x-y}Co_xAl_yO_2$ (where $0 \leq x \leq 0.5$ and $0 \leq y \leq 0.5$), $LiFeO_2$, $V_2O_5$, TiS, MoS, and/or the like.

For example, the positive active material may include $LiNi_xCo_yMn_zO_2$ ($0.6 \leq x \leq 0.95$, $0 \leq y \leq 0.2$, $0 \leq z \leq 0.2$, and x+y+z=1), $LiNi_xCo_yAl_zO_2$ ($0.6 \leq x \leq 0.95$, $0 < y \leq 0.2$, $0 \leq z \leq 0.2$, and x+y+z=1), $LiNi_xCo_yAl_zMn_vO_2$ ($0.6 \leq x \leq 0.95$, $0 < y \leq 0.2$, $0 < v \leq 0.2$, $0 < w \leq 0.2$, and x+y+v+w=1), $LiNi_xCo_yMn_zO_2$ ($0.8 \leq x \leq 0.95$, $0 < y \leq 0.2$, $0 \leq z \leq 0.2$, and x+y+z=1), $LiNi_xCo_yAl_zO_2$ ($0.8 \leq x \leq 0.95$, $0 < y \leq 0.2$, $0 \leq z \leq 0.2$, and x+y+z=1), $LiNi_xCo_yAl_vMn_wO_2$ ($0.8 < x < 0.95$, $0 < y \leq 0.2$, $0 < v \leq 0.2$, $0 < w \leq 0.2$, and x+y+v+w=1), $LiNi_xCo_yMn_zO_2$ ($0.85 \leq x \leq 0.95$, $0 < y \leq 0.2$, $0 \leq z \leq 0.2$, and x+y+z=1), $LiNi_xCo_yAl_zO_2$ ($0.85 \leq x \leq 0.95$, $0 < y \leq 0.2$, $0 \leq z \leq 0.2$, and x+y+z=1), $LiNi_xCo_yAl_vMn_wO_2$ ($0.85 \leq x \leq 0.95$, $0 < y \leq 0.2$, $0 < v \leq 0.2$, $0 < w \leq 0.2$, and x+y+v+w=1), and/or the like.

The conductive material, the binder, and the solvent of the positive active material composition may be substantially the same as those of the negative active material composition. In some embodiments, a plasticizer may further be added to the positive active material composition and/or the negative active material composition to form pores inside the electrode plates.

The amounts of the positive active material, the conductive material, the binder, and the solvent may be the same as those utilized in lithium batteries in the art. At least one selected from the conductive material, the binder, and the solvent may be omitted (e.g., may not be included), depending on the use and the structure of the lithium battery.

In some embodiments, the binder utilized to prepare the positive electrode may be substantially the same as the binder composition contained in the coating layer of the separator.

Subsequently, the above-described composite separator is arranged between the positive electrode and the negative electrode.

In the electrode assembly including a positive electrode, a separator, and a negative electrode structure, the composite separator arranged between the positive electrode and the negative electrode includes the porous substrate and the porous layer formed on both sides of the porous substrate as described above. The porous layer includes the fluorine-based binder and inorganic particles; the electrode assembly including the composite separator interposed between the positive electrode and the negative electrode, wound in a jelly roll shape, has a bending strength of 460 N or more, and the composite separator has a peel strength of 0.3 N/m or more.

The composite separator may be separately prepared and arranged between the positive electrode and the negative electrode. In some embodiments, the composite separator may be prepared by winding an electrode assembly including a positive electrode, a separator, and a negative electrode in a jelly roll shape, accommodating the jelly roll in a battery case or pouch, concurrently pre-charging and thermally softening the jelly roll under a pressure while the jelly roll is accommodated in the battery case or pouch, hot-rolling the charged jelly roll, cold-rolling the charged jelly roll, and performing a formation process of charging and discharging the charged jelly roll under a pressure.

Subsequently, an electrolyte is prepared.

The electrolyte may be in a liquid or gel state.

For example, the electrolyte may be an organic electrolytic solution. In some embodiments, the electrolyte may be a solid. For example, the electrolyte may be boron oxide or lithium oxynitride, but is not limited thereto, and any solid electrolyte commonly utilized in the art may also be utilized. The solid electrolyte may be formed on the negative electrode by sputtering and/or the like. The solid electrolyte may be, for example, a sulfide-based solid electrolyte and/or an oxide-based solid electrolyte.

For example, the organic electrolytic solution may be prepared. The organic electrolytic solution may be prepared by dissolving a lithium salt in an organic solvent.

The organic solvent may be any suitable organic solvent utilized in the art. For example, the organic solvent may be or include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxoran, N,N-dimethyl formamide, N,N-dimethyl acetamide, dimethylsulfoxide, dioxane, 1,2-dimethoxyethane, sulforane, dichloroethane, chlorobenzene, nitrobenzene, diethyleneglycol, dimethyl ether, or any mixture thereof.

The lithium salt may be any suitable lithium salt utilized in the art. For example, the lithium salt may be or include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers of 1 to 10 respectively), LiCl, LiI, or any mixture thereof.

Figure 4:
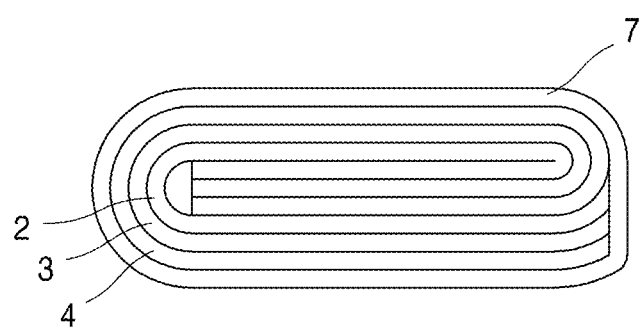
FIG. 4 is a schematic cross-sectional view of a lithium battery including an electrode assembly wound in a flat jelly roll shape according to an embodiment.
Figure 6:
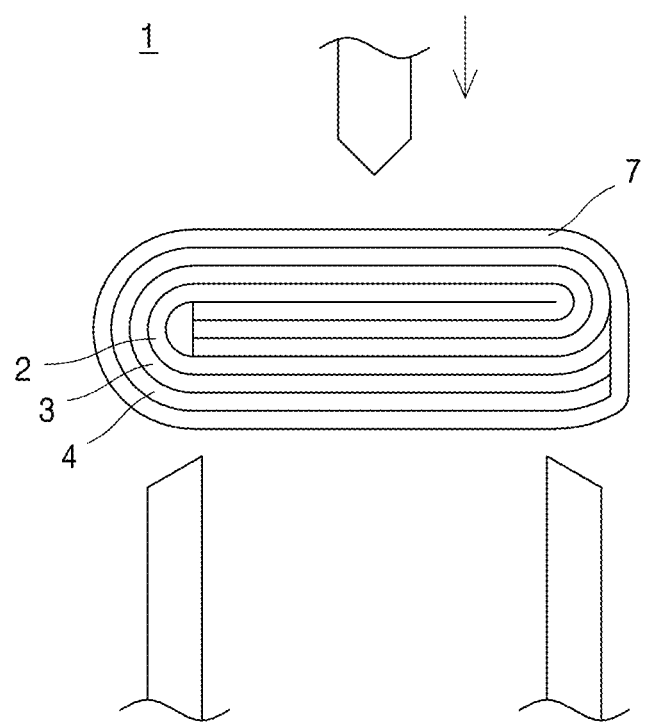
FIG. 6 is a schematic diagram illustrating a method of measuring three (3) point bending strength.

As shown in FIGS. 4 and 6, a lithium battery (i.e., electrode assembly 1) includes a positive electrode 4, a negative electrode 2, and a composite separator 3. The above-described positive electrode 4, negative electrode 2 and separator 3 are wound in a flat jelly roll shape as an electrode assembly and accommodated in a pouch 7. Subsequently, an organic electrolytic solution is injected into a pouch 7 and the pouch 7 is sealed to complete manufacture of the lithium battery. The lithium battery 1 may be a lithium polymer battery.

Figure 5:
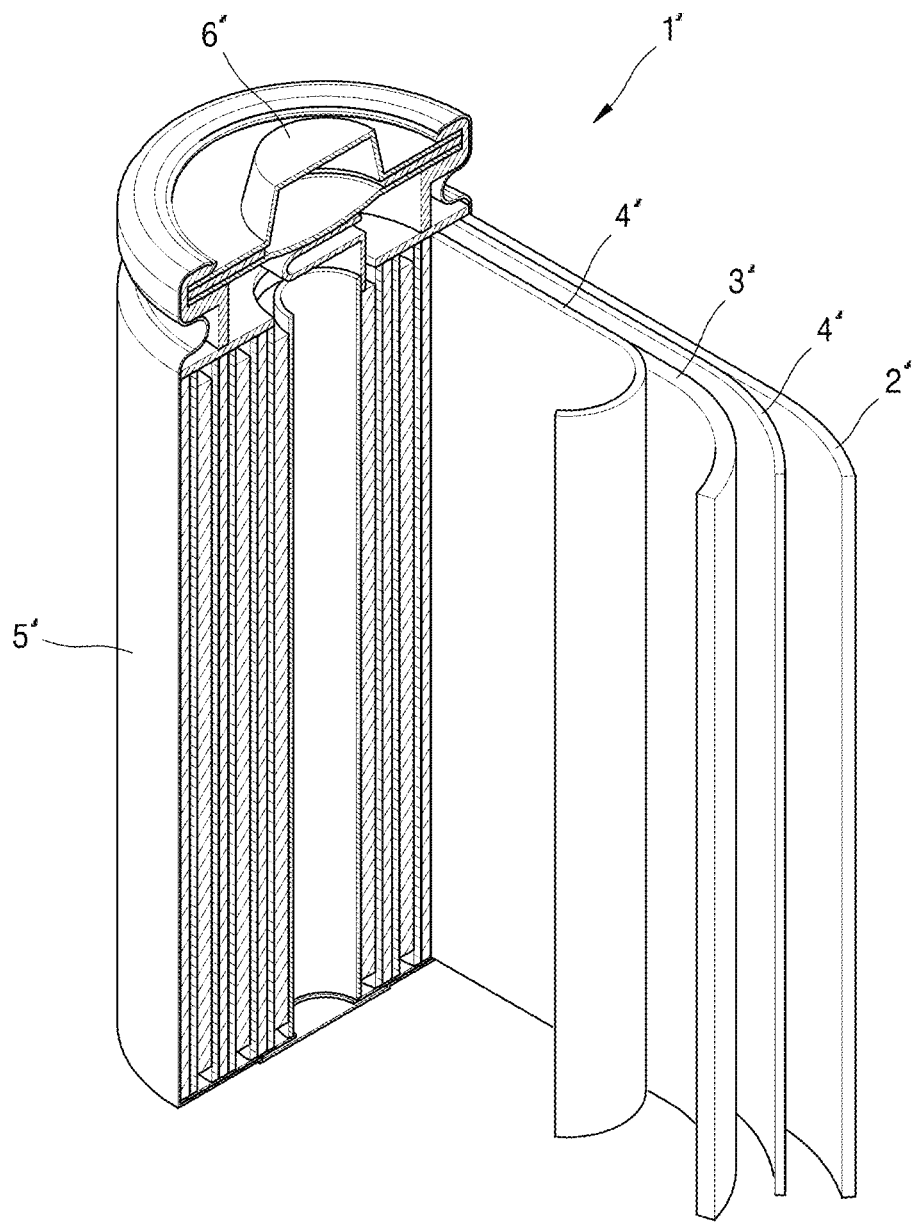
FIG. 5 is a schematic diagram of a lithium battery including an electrode assembly wound in a cylindrical jelly roll shape according to an embodiment.

As shown in FIG. 5, a lithium battery 1' includes a positive electrode 3', a negative electrode 2', and a separator 4'. The described positive electrode 3', negative electrode 2', and separator 4' are wound in a cylindrical jelly roll shape as an electrode assembly and accommodated in a battery case 5'. Subsequently, an organic electrolytic solution is injected into the battery case 5' and the battery case 5' is sealed by a cap assembly 6', thereby completing manufacture of the lithium battery 1'. The battery case may be a cylindrical type or kind, a rectangular type or kind, or a thin-film type or kind. For example, the lithium battery may be a lithium-ion battery.

The lithium battery may be suitably used as power sources for electric vehicles (EVs) due to excellent high rate characteristics and lifespan characteristics. For example, the lithium battery may be suitably used as powder sources for hybrid vehicles such as plug-in hybrid electric vehicles (PHEVs).

Hereinafter, the present disclosure will be described in more detail according to the following examples and comparative examples. However, the following examples are merely presented to explain the present disclosure, and the scope of the present disclosure is not limited thereto.

Preparation of Composite Separator

Example 1

As a fluorine-based binder, a vinylidene fluoride/hexafluoropropylene copolymer including about 1 mol % of a carboxyl group (—COOH), as a hydrophilic group, and including 1 mol % of hexafluoropropylene, was added to acetone, and the mixture was stirred utilizing a stirrer at 45° C. for 3 hours to prepare a binder solution including 10 wt % of a fluorine-based binder. The fluorine-based binder has a weight average molecular weight of 900,000 Da, a glass transition temperature of −30° C., and a melting point of 150° C. As inorganic particles, alumina particles having an average particle diameter of 0.4 μm to 0.6 μm ($D_{50}$ with reference to volume) (AES-11, Sumitomo Chemical Co., Ltd.), were added to acetone and milled utilizing a bead mill at 25° C. for 4 hours to prepare a dispersion including 25 wt % of alumina. The prepared binder solution and the dispersion were mixed such that a weight ratio of the binder to the inorganic particles was 3:7 and stirred utilizing a power mixer at 25° C. for 2 hours to prepare a binder composition. In the prepared binder composition, a solid content was 10 wt %. The amount of the inorganic particles included in the binder composition was 70 wt % based on a total weight of the inorganic particles and the binder.

The prepared binder composition was coated on both sides of a 7 μm-thick polyethylene porous substrate (SK Innovation) by direct metering at a speed of 10 m/min (or 0.17 m/s).

Subsequently, the porous substrate coated with the binder composition was dried while being passed through a dryer (hot-air dryer) under conditions of a hot-air temperature of 50° C. and a water vapor injection rate of 12 g/m³ to form porous coating layers on both sides of the porous substrate, thereby preparing a composite separator.

Nozzles were alternatingly arranged at upper portions and lower portions (e.g., above and below the porous substrate) in the dryer, and hot-air was supplied from the nozzles onto the porous substrate coated with the binder composition while the porous substrate coated with the binder composition was transferred between the nozzles.

The coating amount of the porous layer located on the base porous substrate may be 4.23 g/m² for one side.

A moving speed of the porous substrate coated with the binder composition in the dryer, a speed of hot-air supplied to the porous substrate coated with the binder composition, and a transit time of the porous substrate coated with the binder composition in the dryer are shown in Table 1.

Examples 2 to 9

Additional composite separators were prepared in substantially the same manner as in Example 1, except that at least one selected from the moving speed of the porous substrate coated with the binder composition and the water vapor injection rate was modified.

The moving speed of the porous substrate coated with the binder composition in the dryer and the water vapor injection rate are shown in Table 1.

Comparative Examples 1 to 8

Additional composite separators were prepared in substantially the same manner as in Example 1, except that at least one selected from the moving speed of the porous substrate coated with the binder composition in the dryer and the water vapor injection rate was modified.

The moving speed of the porous substrate coated with the binder composition in the dryer and the water vapor injection rate are shown in Table 1.

A ratio (e) of the hot-air supply speed to the moving speed of porous substrate per unit transit time is as defined in Equation 1:

Speed ratio/transit time (e) [$s^{-1}$]=[hot-air supply speed/moving speed of porous substrate]/transit time of porous substrate in dryer    Equation 1

TABLE 1

| | Hot-air supply speed(a) [m/s] | Moving speed(b) [m/s] | Speed ratio (a/b) | Transit time [s] | Speed ratio/ transit time(e) [$s^{-1}$] | Water vapor injection rate [g/m³] |
|---|---|---|---|---|---|---|
| Example 1 | 15 | 0.17 | 90 | 20 | 4.5 | 12 |
| Example 2 | 15 | 0.17 | 90 | 20 | 4.5 | 15 |
| Example 3 | 15 | 0.17 | 90 | 20 | 4.5 | 17 |
| Example 4 | 15 | 0.25 | 60 | 20 | 3.0 | 12 |
| Example 5 | 15 | 0.25 | 60 | 20 | 3.0 | 15 |
| Example 6 | 15 | 0.25 | 60 | 20 | 3.0 | 17 |
| Example 7 | 15 | 0.33 | 45 | 20 | 2.25 | 12 |
| Example 8 | 15 | 0.33 | 45 | 20 | 2.25 | 15 |
| Example 9 | 15 | 0.33 | 45 | 20 | 2.25 | 17 |
| Comparative Example 1 | 15 | 0.50 | 30 | 20 | 1.50 | 12 |
| Comparative Example 2 | 15 | 0.50 | 30 | 20 | 1.50 | 17 |
| Comparative Example 3 | 15 | 0.67 | 23 | 20 | 1.13 | 12 |
| Comparative Example 4 | 15 | 0.67 | 23 | 20 | 1.13 | 17 |
| Comparative Example 5 | 15 | 1.00 | 15 | 20 | 0.75 | 12 |
| Comparative Example 6 | 15 | 1.00 | 15 | 20 | 0.75 | 17 |
| Comparative Example 7 | 15 | 0.08 | 180 | 20 | 9.00 | 12 |
| Comparative Example 8 | 15 | 0.12 | 129 | 20 | 6.43 | 12 |

As shown in Table 1, the ratio (e) of speed ratio/transit time was in the range of 2.2 to 4.5 under the drying conditions of Examples 1 to 9, but the ratio (e) of speed ratio/transit time was out of this range according to Comparative Examples 1 to 8.

For example, under the separator drying conditions of Comparative Examples 1 to 8, the moving speed of the base porous substrate coated with the binder composition in the dryer was too fast or too slow.

Preparation of Lithium Battery

Example 10

Preparation of Negative Electrode 97 wt % of graphite particles having an average particle diameter of 25 μm (C1SR, Japan Carbon), 1.5 wt % of styrene-butadiene rubber (SBR) binder (Zeon), and 1.5 wt % of carboxylmethylcellulose (CMC, NIPPON A&L) were mixed, and the mixture was added to distilled water and stirred for 60 minutes utilizing a mechanical stirrer to prepare a negative active material slurry. The slurry was applied to a 10 μm-thick copper current collector utilizing a doctor blade and dried in a hot-air dryer at 100° C. for 0.5 hours, further dried in a vacuum at 120° C. for 4 hours, and roll-pressed to prepare a negative electrode plate.

Preparation of Positive Electrode 97 wt % of $LiCoO_2$, 1.5 wt % of carbon black powder as a conductive material, and 1.5 wt % of polyvinylidene fluoride (PVdF, SOLVAY) were mixed, and the mixture was added to N-methyl-2-pyrrolidone and stirred for 30 minutes utilizing a mechanical stirrer to prepare a positive active material slurry. The slurry was applied to a 20 μm-thick aluminum current collector utilizing a doctor blade and dried in a hot-air dryer at 100° C. for 0.5 hours, further dried in a vacuum at 120° C. for hours, and roll-pressed to prepare a positive electrode plate.

Electrode Assembly Jelly Roll

The separator prepared in Example 1 was interposed between the positive electrode plate and the negative electrode plate prepared as described above, and wound to prepare an electrode assembly jelly roll. The jelly roll was inserted into a pouch, an electrolyte solution was injected thereinto, and then the pouch was hermetically sealed.

The electrolyte solution was prepared by dissolving 1.3 M $LiPF_6$ in a mixed solvent including ethylene carbonate (EC)/ethylmethyl carbonate (EMC)/diethyl carbonate (DEC) in a volume ratio of 3/5/2.

The jelly roll inserted into the pouch was thermally softened for 1 hour at 70° C. while applying a pressure of 250 $kgf/cm^2$ thereto.

Subsequently, the jelly roll was hot-rolled for 180 seconds at 85° C. while applying a pressure of 200 $kgf/cm^2$ thereto.

Then, the jelly roll was cold-rolled for 90 seconds at a temperature of 22° C. to 23° C. while applying a pressure of 200 $kgf/cm^2$ thereto.

Next, the pouch was degassed and a lithium battery including the electrode assembly wound in a jelly roll shape was prepared.

Examples 11 to 18

Additional lithium batteries were prepared in substantially the same manner as in Example 10, except that the composite separators prepared in Preparation Examples 2 to 9 were respectively utilized.

Comparative Examples 9 to 16

Additional lithium batteries were prepared in substantially the same manner as in Example 10, except that the composite separators prepared in Comparative Preparation Examples 1 to 8 were respectively utilized.

Evaluation Example 1: Measurement of Surface Morphology of Porous Layer

Figure 2:
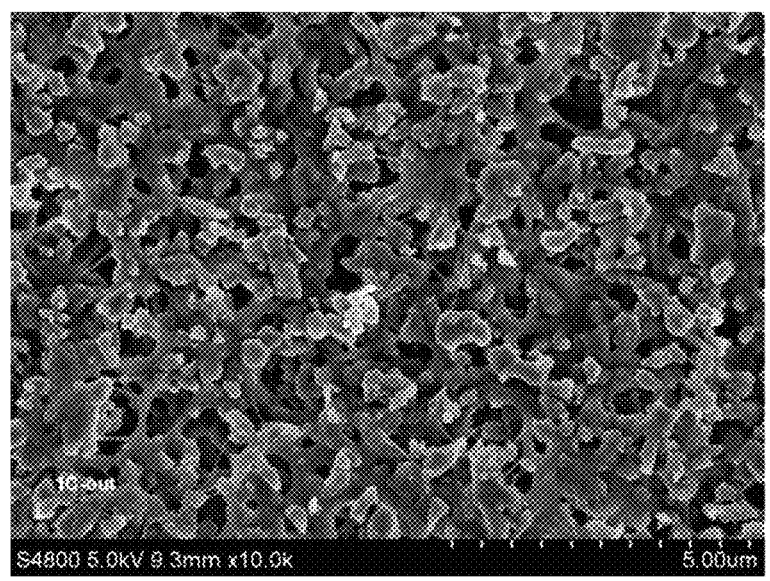
FIG. 2 is an SEM image of a surface of a porous layer of a composite separator prepared in Comparative Example 1.

The surface morphologies of the composite separators prepared in Examples 1 to 9 and Comparative Examples 1 to 8 were analyzed by observing the surfaces of the composite separators utilizing a scanning electron microscope, and some of the results are shown in FIGS. 1 and 2.

Referring to FIG. 1, the surface of the porous layer of the composite separator prepared in Example 1 had a morphology including a plurality of pores discontinuously arranged in the form of discontinuous on the polymer film.

In contrast, referring to FIG. 2, the surface of the porous layer of the composite separator prepared in Comparative Example 1 had a morphology including a plurality of pores formed by a plurality of particles arranged thereon.

Thus, the composite separator of Example 1 showed a different morphology from the composite separator of Comparative Example 1.

Evaluation Example 2: Measurement of Number of Pores per Unit Area of Separator

The surfaces of the composite separators respectively prepared in Examples 1 to 9 and Comparative Examples 1 to 8 were observed utilizing a scanning electron microscope, and the number of pores per unit area of the surface of the porous layer in the composite separator was manually measured (counted). The results are shown in Table 2.

Evaluation Example 3: Adhesion Force (Peel Strength) Test of Composite Separator The adhesion force between the porous substrate and the porous layer in each the composite separators respectively prepared in Examples 1 to 9 and Comparative Examples 1 to 8 was evaluated by measuring peel strength therebetween.

The adhesion force between the porous substrate and the porous layer was measured by performing 180 degree Peel Test (INSTRON).

For example, each of the composite separator prepared in Examples 1 to 9 and Comparative Examples 1 to 8 was attached to a slide glass with double-sided tape, and then uniformly compressed with a hand roller.

In an adhesion meter, peel strength (which is the force applied to move 30 mm while peeling at a tension speed of 10 mm/min in the 180 degree direction) was measured, and the results are shown in Table 2.

Evaluation Example 4: Bending Strength Test of Composite Separator

The 3 point bending strength of each of the wound battery assemblies prepared in Examples 10 to 18 and Comparative Examples 9 to 16 was measured and adhesion force thereof was evaluated.

A flat wound electrode assembly is a rectangular parallelepiped having a length L of 40.5 mm, a width W of 75 mm, and a thickness of 5.1 mm.

Referring to FIG. 6, in an electrode assembly 1, a positive electrode 4, a negative electrode 2, and a separator 3 are wound in a flat jelly roll shape and accommodated in a pouch 7. Subsequently, an organic electrolytic solution is injected into the pouch 7 and the electrode assembly 1 is sealed.

Referring to FIG. 6, the electrode assembly 1 was horizontally mounted between two supports having an interval of 60 mm of a 3 point bending analyzer (INSTRON, Single column 3344) such that a midpoint of the length of the electrode assembly is located at the center of the two support, and a strength at which the electrode assembly 1 was bent, i.e., maximum strength, was measured while pressing downward utilizing a jig mounted with a loadcell having a maximum weight of 1 kN in a vertical direction at a speed of 5 mm/mm at the midpoint of the length of the electrode assembly 1. The measured maximum intensity was taken as the bending strength of the electrode assembly.

The measured bending strengths are shown in Table 2.

TABLE 2

| | Number of pores having a diameter of 500 nm to 1000 nm per 1 µm² (a) | Number of pores having a diameter less than 500 mm per 1 µm² of the porous layer (b) | Pore number ratio (a/b) | Coating amount of coating layer [g/m²] | Cell bending strength [N] | Peel strength [N/m] |
|---|---|---|---|---|---|---|
| Example 1 | 0.3 | 0.7 | 0.43 | 4.23 | 526 | 0.5 |
| Example 2 | 0.4 | 0.6 | 0.67 | 4.19 | 532 | 0.5 |
| Example 3 | 0.4 | 0.6 | 0.67 | 4.22 | 545 | 0.3 |
| Example 4 | 0.3 | 0.8 | 0.38 | 4.23 | 521 | 0.5 |
| Example 5 | 0.3 | 0.7 | 0.43 | 4.20 | 516 | 0.5 |
| Example 6 | 0.4 | 0.8 | 0.50 | 4.19 | 538 | 0.3 |
| Example 7 | 0.3 | 1.0 | 0.30 | 4.22 | 475 | 0.8 |
| Example 8 | 0.3 | 1.0 | 0.30 | 4.19 | 498 | 0.7 |
| Example 9 | 0.3 | 0.9 | 0.33 | 4.18 | 505 | 0.6 |
| Comparative Example 1 | 0.1 | 2.0 | 0.05 | 4.22 | 412 | 1.2 |
| Comparative Example 2 | 0.2 | 1.6 | 0.13 | 4.22 | 425 | 1.0 |
| Comparative Example 3 | 0.1 | 2.0 | 0.05 | 4.19 | 375 | 1.4 |
| Comparative Example 4 | 0.1 | 2.1 | 0.05 | 4.23 | 402 | 1.2 |
| Comparative Example 5 | 0.1 | 2.1 | 0.05 | 4.19 | 298 | 1.6 |
| Comparative Example 6 | 0.1 | 1.6 | 0.06 | 4.21 | 317 | 1.4 |
| Comparative Example 7 | 0.5 | 0.3 | 1.67 | 4.18 | 562 | 0.1 |
| Comparative Example 8 | 0.4 | 0.4 | 1.00 | 4.25 | 555 | 0.2 |

As shown in Table 2, while the porous layers included in the composite separators prepared in Examples 1 to 9 had 0.3 to 0.4 pores having a diameter of 500 nm to 1000 nm per 1 µm², the porous layers included in the composite separators prepared in Comparative Examples 1 to 6 had 0.2 pores having a diameter of 500 nm to 1000 nm per 1 µm².

In some embodiments, while the porous layers included in the composite separators prepared in Examples 1 to 9 each had 0.5 to 1.5 pores having a diameter less than 500 mm per 1 µm², the porous layers included in the composite separators prepared in Comparative Examples 1 to 6 each had 1.6 or more pores having a diameter less than 500 mm per 1 µm². All of the composite separators prepared in Examples 1 to 6 had decreased pore size ratios (a/b) of the porous layers when compared with the composite separators prepared in Examples 1 to 9.

All of the composite separators prepared in Comparative Examples 7 and 8 had increased pore size ratios (a/b) in the porous layer when compared with the composite separators prepared in Examples 1 to 9.

While the peel strength of each of the composite separators prepared in Examples 1 to 9 was in the range of 0.3 N/m to 0.8 N/m, the peel strength of each of the composite separators prepared in Comparative Examples 7 and 8 was less than 0.3 N/m, indicating poor adhesion force between the porous layer of the composite separator and the base substrate.

While the bending strength of each of the composite separators prepared in Examples 1 to 9 was in the range of 460 N to 550 N, the bending strength of each of the composite separators prepared in Comparative Examples 1 to 6 was less than 460 N indicating poor adhesion force between the composite separator and the electrode.

The coating amounts of the porous layers included in the composite separators of Examples 1 to 9 and Comparative Examples 1 to 8 were similar to one another.

Evaluation Example 5: Evaluation of Charging and Discharging Characteristics (Room Temperature Lifespan)

The lithium batteries prepared in Examples 1 to 9 and Comparative Examples 1 to 8 were charged at a constant current of 0.2 C for 1 hour at a temperature of 45° C. while applying a pressure of kgf/cm² to the batteries until a voltage reached 4.3 V, and charged at a constant voltage until the current reached 0.05 C while maintaining the voltage of 4.3 V. Subsequently, a cycle of discharging the lithium batteries at a constant current of 0.2 C until the voltage reached 3.0 V was performed once for formation.

The lithium batteries that underwent the formation cycle were charged at a constant current of 0.7 C until the voltage reached 4.35 V (vs. Li) at 25° C., and charged at a constant voltage until the current reached 0.025 C while maintaining the voltage of 4.35 V. Subsequently, a cycle of discharging the lithium battery at a constant current of 1.0 C until the voltage reached 3.0 V (vs. Li) was repeated 500 times.

Some of the results of the charging and discharging tests are shown in Table 3. The room temperature capacity retention rate is represented by Equation 2.

Room temperature capacity retention rate [%]=[discharge capacity at 500$^{th}$ cycle/discharge capacity at 1$^{st}$ cycle]×100   Equation 2

TABLE 3

| | Capacity retention rate [%] |
|---|---|
| Example 1 | 87.6 |
| Example 2 | 87.3 |
| Example 3 | 88.1 |
| Example 4 | 86.9 |
| Example 5 | 87.0 |
| Example 6 | 87.3 |
| Example 7 | 85.9 |
| Example 8 | 85.8 |
| Example 9 | 86.6 |
| Comparative Example 1 | 81.9 |
| Comparative Example 2 | 84.1 |
| Comparative Example 3 | 80.3 |
| Comparative Example 4 | 82.7 |
| Comparative Example 5 | 76.5 |
| Comparative Example 6 | 78.3 |

As shown in Table 3, the lithium batteries according to Examples 1 to 9 each had improved room temperature lifespan characteristics when compared with each of the lithium batteries according to Comparative Examples 1 to 6.

The lithium batteries according to Comparative Examples 7 and 8 each had a higher defect rate than each of the lithium batteries according to Examples 1 to 9 when a plurality of (e.g., multiple) lithium batteries were manufactured.

According to an embodiment, by limiting (e.g., selecting) the amount of the non-solvent supplied during the drying process and the ratio of the hot-air supply speed to the moving speed of the porous substrate per unit transit time in the preparation of the composite separator, the prepared composite separator may have an increased peel strength and a pore size ratio within a constant range, and the lithium battery may have increased energy density and improved charging and discharging characteristics by including the composite separator.

As used herein, the terms "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that the embodiments described herein should be considered in a descriptive sense only, and not for purposes of limitation. Descriptions of features or aspects within each embodiment should typically be considered as being available for other similar features or aspects in other embodiments. While one or more embodiments have been described with reference to the drawings, it will be understood by those of ordinary skill in the art that one or more suitable changes in form and details may be made therein without departing from the spirit and scope of the disclosure as defined by claims and equivalents thereof.

What is claimed is:

1. A composite separator, the composite separator comprising:
    a porous substrate; and
    a porous layer formed on one side or both sides of the porous substrate,
    wherein a coating amount of the porous layer is in a range from 3.5 g/m² to 4.5 g/m²,
    wherein the porous layer comprises a fluorine-based binder having a polar functional group and inorganic particles,
    wherein the porous layer has a surface morphology in which a plurality of pores are discontinuously arranged in the form of island on a polymer film,
    wherein a ratio (a/b) of the number of pores having a diameter of 500 nm to 1000 nm per 1 μm² of the porous layer (a) to the number of pores having a diameter less than 500 mm per 1 μm² of the porous layer (b) is from 0.25 to 0.85,
    wherein the porous layer has a peel strength of 0.3 N/m or more with respect to the porous substrate, and
    wherein an area covered by the plurality of pores is smaller than an area covered by the polymer film.

2. The composite separator of claim 1, wherein the peel strength is from 0.3 N/m to 0.95 N/m.

3. The composite separator of claim 1, wherein the porous layer comprises 0.3 to 0.4 pores having a diameter of 500 nm to 1000 nm per 1 μm², and 0.5 to 1.5 pores having a diameter less than 500 nm per 1 μm².

4. The composite separator of claim 1, wherein each of the plurality of pores has a diameter of 500 nm to 1000 nm or a diameter less than 500 nm.

5. The composite separator of claim 1, wherein the inorganic particles comprise at least one selected from alumina, titania, boehmite, and barium sulfate.

6. The composite separator of claim 1, wherein an amount of the inorganic particles is 90 wt % or less based on a total weight of the porous layer.

7. The composite separator of claim 1, wherein the fluorine-based binder comprises a vinylidene fluoride-hexafluoropropylene copolymer, and
    the vinylidene fluoride-hexafluoropropylene copolymer has a glass transition temperature of −10° C. or lower and a melting point of 150° C. or higher.

8. The composite separator of claim 7, wherein the vinylidene fluoride-hexafluoropropylene copolymer has a weight average molecular weight of 700,000 Dalton to 1,200,000 Dalton.

9. An electrode assembly comprising:
    a positive electrode;
    a negative electrode; and
    a composite separator interposed between the positive electrode and the negative electrode,
    wherein the positive electrode, the negative electrode, and the composite separator are wound in a jelly roll shape,
    wherein the electrode assembly is configured to have a bending strength of 460 N or more, the bending strength being an amount of force needed to bend the jelly roll shaped electrode in a downward direction, and
    wherein the composite separator comprises:
        a porous substrate; and
        a porous layer formed on one side or both sides of the porous substrate,
    wherein a coating amount of the porous layer is in a range from 3.5 g/m² to 4.5 g/m²,
        wherein the porous layer comprises a fluorine-based binder having a polar functional group and inorganic particles,
        wherein the porous layer has a surface morphology in which a plurality of pores are discontinuously arranged in the form of island on a polymer film,
        wherein a ratio (a/b) of the number of pores having a diameter of 500 nm to 1000 nm per 1 μm² of the porous layer (a) to the number of pores having a diameter less than 500 mm per 1 μm² of the porous layer (b) is from 0.25 to 0.85, and
        wherein the porous layer has a peel strength of 0.3 N/m or more with respect to the porous substrate.

10. The composite separator electrode assembly of claim 9, wherein the bending strength is from 460 N to 550 N.

11. An electrode assembly comprising:
a positive electrode;
a negative electrode; and
the composite separator of claim 1 interposed between the positive electrode and the negative electrode,
wherein the positive electrode, the negative electrode, and the composite separator are wound in a jelly roll shape, and
wherein the electrode assembly is configured to have a bending strength of 460 N or more, the bending strength being an amount of force needed to bend the jelly roll shaped electrode in a downward direction.

12. The electrode assembly of claim 11, wherein the bending strength is from 460 N to 550 N.

13. A lithium battery, the lithium battery comprising:
an electrode assembly comprising:
a positive electrode;
a negative electrode; and
the composite separator according to claim 1 interposed between the positive electrode and the negative electrode,
wherein the electrode assembly is wound in a jelly roll shape.

\* \* \* \* \*